United States Patent
Anzures et al.

(10) Patent No.: US 11,023,122 B2
(45) Date of Patent: Jun. 1, 2021

(54) VIDEO MANAGER FOR PORTABLE MULTIFUNCTION DEVICE

(71) Applicant: Apple Inc., Cupertino, CA (US)

(72) Inventors: Freddy Allen Anzures, San Francisco, CA (US); Gregory Christie, San Jose, CA (US); Scott Forstall, Los Altos, CA (US); Charles J. Pisula, Bethesda, MD (US)

(73) Assignee: Apple Inc., Cupertino, CA (US)

( * ) Notice: Subject to any disclaimer, the term of this patent is extended or adjusted under 35 U.S.C. 154(b) by 657 days.

(21) Appl. No.: 14/043,788

(22) Filed: Oct. 1, 2013

(65) Prior Publication Data

US 2014/0059434 A1    Feb. 27, 2014

Related U.S. Application Data

(60) Continuation of application No. 13/155,304, filed on Jun. 7, 2011, now Pat. No. 8,547,355, which is a division of application No. 11/850,008, filed on Sep. 4, 2007, now Pat. No. 7,956,849.

(60) Provisional application No. 60/937,993, filed on Jun. 29, 2007, provisional application No. 60/946,973, filed on Jun. 28, 2007, provisional application No. (Continued)

(51) Int. Cl.
*G06F 3/0488* (2013.01)
*H04M 1/725* (2021.01)
*G06F 1/16* (2006.01)

(52) U.S. Cl.
CPC .......... *G06F 3/0488* (2013.01); *G06F 1/1626* (2013.01); *G06F 1/1686* (2013.01); *G06F 3/04883* (2013.01); *H04M 1/72522* (2013.01);
*G06F 2200/1614* (2013.01); *G06F 2200/1637* (2013.01); *G06F 2203/04808* (2013.01)

(58) Field of Classification Search
None
See application file for complete search history.

(56) References Cited

U.S. PATENT DOCUMENTS 5,347,295 A    9/1994   Agulnick et al.
5,559,301 A *  9/1996   Bryan, Jr. ............ G10H 1/0008
                                              345/173

(Continued)

FOREIGN PATENT DOCUMENTS

CN    1203679 A    12/1998
CN    1278340 A    12/2000

(Continued)

OTHER PUBLICATIONS

PortableApps, "VLC Media Player Portable", available: Aug. 21, 2006, https://portableapps.com/apps/music_video/vlc_portable, https://web.archive.org/web/20060821050847/https://portableapps.com/apps/music_video/vlc_portable (Year: 2006).*

(Continued)

*Primary Examiner* — Seth A Silverman
(74) *Attorney, Agent, or Firm* — Dentons US LLP

(57) ABSTRACT

A video player for a portable multifunction device is disclosed. In some embodiments, a list of video items is displayed in a portrait orientation of a touch screen display of a portable electronic device. Upon user selection of a respective video item in the list, the user selected video item is automatically displayed in a landscape orientation of the touch screen display.

21 Claims, 15 Drawing Sheets

Related U.S. Application Data

60/883,784, filed on Jan. 6, 2007, provisional application No. 60/879,469, filed on Jan. 8, 2007, provisional application No. 60/879,253, filed on Jan. 7, 2007, provisional application No. 60/824,769, filed on Sep. 6, 2006.

(56) References Cited

U.S. PATENT DOCUMENTS

| | | |
|---|---|---|
| 5,610,653 A | 3/1997 | Abecassis |
| 5,612,719 A | 3/1997 | Beernink et al. |
| 5,739,821 A | 4/1998 | Ho et al. |
| 5,760,773 A | 6/1998 | Berman et al. |
| 5,828,370 A * | 10/1998 | Moeller ............... H04N 5/4401 348/E5.102 |
| 6,025,842 A | 2/2000 | Filetto et al. |
| 6,040,824 A | 3/2000 | Maekawa et al. |
| 6,069,606 A | 5/2000 | Sciammarella et al. |
| 6,073,036 A | 6/2000 | Heikkinen et al. |
| 6,133,916 A | 10/2000 | Bukszar et al. |
| 6,177,936 B1 | 1/2001 | Cragun |
| 6,199,082 B1 | 3/2001 | Ferrel et al. |
| 6,243,080 B1 | 6/2001 | Molne |
| 6,262,732 B1 | 7/2001 | Coleman et al. |
| 6,297,795 B1 | 10/2001 | Kato et al. |
| 6,313,855 B1 | 11/2001 | Shuping et al. |
| 6,326,970 B1 | 12/2001 | Mott et al. |
| 6,349,410 B1 | 2/2002 | Lortz |
| 6,359,615 B1 | 3/2002 | Singh |
| 6,411,283 B1 | 6/2002 | Murphy |
| 6,466,198 B1 | 10/2002 | Feinstein |
| 6,466,203 B2 | 10/2002 | Van Ee |
| 6,486,895 B1 | 11/2002 | Robertson et al. |
| 6,489,975 B1 | 12/2002 | Patil et al. |
| 6,496,182 B1 | 12/2002 | Wong et al. |
| 6,570,583 B1 | 5/2003 | Kung et al. |
| 6,590,568 B1 | 7/2003 | Astala et al. |
| 6,613,100 B2 | 9/2003 | Miller |
| 6,639,584 B1 | 10/2003 | Li |
| 6,683,628 B1 | 1/2004 | Nakagawa et al. |
| 6,724,403 B1 | 4/2004 | Santoro et al. |
| 6,771,250 B1 | 8/2004 | Oh |
| 6,847,778 B1 * | 1/2005 | Vallone ............... G06F 3/04847 386/205 |
| 6,928,461 B2 | 8/2005 | Tuli |
| 6,956,564 B1 | 10/2005 | Williams |
| 6,966,837 B1 | 11/2005 | Best |
| 7,030,861 B1 | 4/2006 | Westerman et al. |
| 7,054,965 B2 | 5/2006 | Bell et al. |
| 7,075,512 B1 | 7/2006 | Fabre et al. |
| 7,085,590 B2 | 8/2006 | Kennedy et al. |
| 7,149,549 B1 | 12/2006 | Ortiz et al. |
| 7,152,210 B1 | 12/2006 | Van Den Hoven et al. |
| 7,166,791 B2 | 1/2007 | Robbin et al. |
| 7,171,625 B1 | 1/2007 | Sacchi |
| 7,346,855 B2 | 3/2008 | Hellyar et al. |
| 7,461,353 B2 | 12/2008 | Rohrabaugh et al. |
| 7,479,949 B2 | 1/2009 | Jobs et al. |
| 7,480,870 B2 | 1/2009 | Anzures et al. |
| 7,509,588 B2 | 3/2009 | Van Os et al. |
| 7,587,671 B2 | 9/2009 | Saft et al. |
| 7,596,761 B2 | 9/2009 | Lemay et al. |
| 7,676,767 B2 | 3/2010 | Hofmeister et al. |
| 7,730,401 B2 | 6/2010 | Gillespie et al. |
| 7,739,271 B2 | 6/2010 | Cook et al. |
| 7,788,583 B1 | 8/2010 | Amzallag et al. |
| 7,831,926 B2 | 11/2010 | Rohrabaugh et al. |
| 7,844,889 B2 | 11/2010 | Rohrabaugh et al. |
| 7,864,163 B2 | 1/2011 | Ording et al. |
| 7,956,849 B2 | 6/2011 | Anzures et al. |
| 8,214,768 B2 | 7/2012 | Boule et al. |
| 8,531,423 B2 | 9/2013 | Anzures et al. |
| 8,547,355 B2 | 10/2013 | Anzures et al. |
| 8,669,950 B2 | 3/2014 | Forstall et al. |
| 8,842,074 B2 | 9/2014 | Ording et al. |
| 8,912,988 B2 | 12/2014 | Tomida et al. |
| 9,927,970 B2 | 3/2018 | Ording et al. |
| 2001/0024195 A1 | 9/2001 | Hayakawa |
| 2002/0015064 A1 | 2/2002 | Robotham et al. |
| 2002/0033848 A1 | 3/2002 | Sciammarella et al. |
| 2002/0093531 A1 | 7/2002 | Barile |
| 2002/0152283 A1 | 10/2002 | Dutta et al. |
| 2002/0163545 A1 | 11/2002 | Hii |
| 2002/0191029 A1 | 12/2002 | Gillespie et al. |
| 2003/0013483 A1 | 1/2003 | Ausems et al. |
| 2003/0025676 A1 | 2/2003 | Cappendijk |
| 2003/0033331 A1 | 2/2003 | Sena et al. |
| 2003/0063125 A1 | 4/2003 | Miyajima et al. |
| 2003/0076301 A1 | 4/2003 | Tsuk et al. |
| 2003/0076303 A1 | 4/2003 | Huppi |
| 2003/0081135 A1 | 5/2003 | Boll |
| 2003/0095096 A1 | 5/2003 | Robbin et al. |
| 2003/0095135 A1 | 5/2003 | Kaasila et al. |
| 2003/0095155 A1 | 5/2003 | Johnson |
| 2003/0117427 A1 | 6/2003 | Haughawout et al. |
| 2003/0117440 A1 | 6/2003 | Hellyar et al. |
| 2003/0135649 A1 | 7/2003 | Buckley et al. |
| 2003/0164861 A1 | 9/2003 | Barbanson et al. |
| 2003/0193524 A1 | 10/2003 | Bates et al. |
| 2003/0204815 A1 | 10/2003 | Edwards et al. |
| 2004/0003117 A1 | 1/2004 | Mccoy et al. |
| 2004/0049541 A1 | 3/2004 | Swahn et al. |
| 2004/0085351 A1 | 5/2004 | Tokkonen |
| 2004/0100479 A1 | 5/2004 | Nakano et al. |
| 2004/0103371 A1 | 5/2004 | Chen et al. |
| 2004/0125081 A1 | 7/2004 | Hayakawa |
| 2004/0143796 A1 | 7/2004 | Lerner et al. |
| 2004/0167783 A1 | 8/2004 | Nagai |
| 2004/0169674 A1 | 9/2004 | Linjama |
| 2004/0201595 A1 | 10/2004 | Manchester |
| 2004/0205496 A1 | 10/2004 | Dutta et al. |
| 2004/0215719 A1 | 10/2004 | Altshuler |
| 2004/0223004 A1 | 11/2004 | Lincke et al. |
| 2004/0268393 A1 | 12/2004 | Hunleth et al. |
| 2004/0268400 A1 | 12/2004 | Barde et al. |
| 2005/0005246 A1 | 1/2005 | Card et al. |
| 2005/0012723 A1 | 1/2005 | Pallakoff |
| 2005/0020317 A1 | 1/2005 | Koyama |
| 2005/0044509 A1 | 2/2005 | Hunleth et al. |
| 2005/0057524 A1 | 3/2005 | Hill et al. |
| 2005/0066286 A1 | 3/2005 | Makela |
| 2005/0071364 A1 | 3/2005 | Xie et al. |
| 2005/0071736 A1 | 3/2005 | Schneider et al. |
| 2005/0071778 A1 | 3/2005 | Tokkonen |
| 2005/0079896 A1 | 4/2005 | Kokko et al. |
| 2005/0091107 A1 | 4/2005 | Blum |
| 2005/0093826 A1 | 5/2005 | Huh |
| 2005/0097444 A1 | 5/2005 | Ivarsey et al. |
| 2005/0114788 A1 | 5/2005 | Fabritius |
| 2005/0166232 A1 | 7/2005 | Lamkin et al. |
| 2005/0177783 A1 | 8/2005 | Agrawala et al. |
| 2005/0183017 A1 | 8/2005 | Cain |
| 2005/0192924 A1 | 9/2005 | Drucker et al. |
| 2005/0204385 A1 | 9/2005 | Sull et al. |
| 2005/0229118 A1 | 10/2005 | Chiu et al. |
| 2005/0283739 A1 | 12/2005 | Mohr et al. |
| 2005/0283798 A1 | 12/2005 | Hunleth et al. |
| 2005/0285880 A1 | 12/2005 | Lai et al. |
| 2006/0001656 A1 | 1/2006 | Laviola et al. |
| 2006/0017692 A1 | 1/2006 | Wehrenberg et al. |
| 2006/0026521 A1 | 2/2006 | Hotelling et al. |
| 2006/0026535 A1 * | 2/2006 | Hotelling ............... G06F 3/0418 715/863 |
| 2006/0033761 A1 | 2/2006 | Suen et al. |
| 2006/0036944 A1 | 2/2006 | Wilson |
| 2006/0048076 A1 | 3/2006 | Vronay et al. |
| 2006/0053387 A1 | 3/2006 | Ording |
| 2006/0064647 A1 | 3/2006 | Tapuska et al. |
| 2006/0085743 A1 | 4/2006 | Baudisch et al. |
| 2006/0097991 A1 | 5/2006 | Hotelling et al. |
| 2006/0101354 A1 | 5/2006 | Hashimoto et al. |
| 2006/0123360 A1 | 6/2006 | Anwar et al. |
| 2006/0125799 A1 | 6/2006 | Hillis et al. |
| 2006/0143574 A1 | 6/2006 | Ito et al. |

(56) References Cited

U.S. PATENT DOCUMENTS

| | | | |
|---|---|---|---|
| 2006/0146016 A1 | 7/2006 | Chan et al. | |
| 2006/0146038 A1 | 7/2006 | Park et al. | |
| 2006/0164382 A1 | 7/2006 | Kulas et al. | |
| 2006/0176403 A1 | 8/2006 | Gritton et al. | |
| 2006/0197753 A1 | 9/2006 | Hotelling | |
| 2006/0262336 A1 | 11/2006 | Venkatachalam et al. | |
| 2006/0265643 A1 | 11/2006 | Saft et al. | |
| 2006/0267995 A1* | 11/2006 | Radloff | G11B 27/105 345/530 |
| 2006/0271858 A1 | 11/2006 | Yolleck et al. | |
| 2006/0277588 A1 | 12/2006 | Harrington et al. | |
| 2006/0284852 A1 | 12/2006 | Hofmeister et al. | |
| 2007/0004451 A1 | 1/2007 | C. Anderson | |
| 2007/0024646 A1 | 2/2007 | Saarinen et al. | |
| 2007/0038612 A1 | 2/2007 | Sull et al. | |
| 2007/0067738 A1 | 3/2007 | Flynt et al. | |
| 2007/0106952 A1 | 5/2007 | Matas et al. | |
| 2007/0152984 A1 | 7/2007 | Ording et al. | |
| 2007/0155434 A1 | 7/2007 | Jobs et al. | |
| 2007/0157228 A1 | 7/2007 | Bayer et al. | |
| 2007/0250768 A1 | 10/2007 | Funakami et al. | |
| 2007/0263176 A1 | 11/2007 | Nozaki et al. | |
| 2008/0034029 A1* | 2/2008 | Fang | H04L 12/282 709/203 |
| 2008/0042984 A1 | 2/2008 | Lim et al. | |
| 2008/0055272 A1 | 3/2008 | Anzures et al. | |
| 2008/0062137 A1 | 3/2008 | Brodersen et al. | |
| 2008/0122796 A1 | 5/2008 | Jobs et al. | |
| 2008/0165148 A1 | 7/2008 | Williamson et al. | |
| 2008/0165152 A1 | 7/2008 | Forstall et al. | |
| 2008/0165153 A1 | 7/2008 | Platzer et al. | |
| 2008/0174570 A1 | 7/2008 | Jobs et al. | |
| 2008/0231610 A1 | 9/2008 | Hotelling et al. | |
| 2014/0092125 A1 | 4/2014 | Max et al. | |
| 2015/0046849 A1 | 2/2015 | Forstall et al. | |
| 2015/0082240 A1 | 3/2015 | Forstall et al. | |
| 2017/0269794 A1 | 9/2017 | Forstall et al. | |
| 2018/0067643 A1 | 3/2018 | Ording et al. | |
| 2019/0155458 A1 | 5/2019 | Forstall et al. | |
| 2019/0196709 A1 | 6/2019 | Ording et al. | |

FOREIGN PATENT DOCUMENTS

| | | |
|---|---|---|
| CN | 1553367 A | 12/2004 |
| CN | 1577383 A | 2/2005 |
| CN | 1613105 A | 5/2005 |
| CN | 1658137 A | 8/2005 |
| CN | 1752979 A | 3/2006 |
| EP | 0 476 972 A2 | 3/1992 |
| EP | 0 651 544 A2 | 5/1992 |
| EP | 0 701 220 A1 | 3/1996 |
| EP | 0 880 090 A2 | 11/1998 |
| EP | 0990202 A1 | 4/2000 |
| EP | 1 049 305 A1 | 11/2000 |
| EP | 1255186 A2 | 11/2002 |
| EP | 1 517 228 A2 | 3/2005 |
| EP | 1564632 A2 | 8/2005 |
| EP | 1 632 874 A2 | 3/2006 |
| EP | 1640878 A1 | 3/2006 |
| EP | 1 752 880 A1 | 2/2007 |
| FR | 2830093 A3 | 3/2003 |
| GB | 2 301 217 A | 11/1996 |
| JP | 6-95794 A | 4/1994 |
| JP | 7-225829 A | 8/1995 |
| JP | 8-044253 A | 2/1996 |
| JP | 9-138745 A | 5/1997 |
| JP | 10-96648 A | 4/1998 |
| JP | 10-97543 A | 4/1998 |
| JP | 10198517 A | 7/1998 |
| JP | 11-15817 A | 1/1999 |
| JP | 11 143604 | 5/1999 |
| JP | 11242539 A | 9/1999 |
| JP | 200056889 A | 2/2000 |
| JP | 2000-115527 A | 4/2000 |
| JP | 2000 181436 | 6/2000 |
| JP | 2000163444 A | 6/2000 |
| JP | 2000-242390 A | 9/2000 |
| JP | 2001-014133 A | 1/2001 |
| JP | 2001142604 A | 5/2001 |
| JP | 2001 175386 | 6/2001 |
| JP | 2001-265481 A | 9/2001 |
| JP | 2001516914 A | 10/2001 |
| JP | 2002-7476 A | 1/2002 |
| JP | 2002-34023 A | 1/2002 |
| JP | 2002 244635 | 8/2002 |
| JP | 2002-259001 A | 9/2002 |
| JP | 2002-323850 A | 11/2002 |
| JP | 2003-30121 A | 1/2003 |
| JP | 2003-512676 A | 4/2003 |
| JP | 2003-191392 A | 7/2003 |
| JP | 2003195997 A | 7/2003 |
| JP | 2003-252808 A | 9/2003 |
| JP | 2003-263256 A | 9/2003 |
| JP | 2004-132741 A | 4/2004 |
| JP | 2004-518218 A | 6/2004 |
| JP | 2004-199696 A | 7/2004 |
| JP | 2004206230 A | 7/2004 |
| JP | 2004-227108 A | 8/2004 |
| JP | 2004 288208 | 10/2004 |
| JP | 2004 318505 | 11/2004 |
| JP | 2005 018229 | 1/2005 |
| JP | 2005018792 A | 1/2005 |
| JP | 2005-109798 A | 4/2005 |
| JP | 2005-110286 A | 4/2005 |
| JP | 2005-151378 A | 6/2005 |
| JP | 2005-202482 A | 7/2005 |
| JP | 2005-234199 A | 9/2005 |
| JP | 2005-234291 A | 9/2005 |
| JP | 2005 242669 | 9/2005 |
| JP | 2005 267049 | 9/2005 |
| JP | 2005-277847 A | 10/2005 |
| JP | 2005-303907 A | 10/2005 |
| JP | 2006-18348 A | 1/2006 |
| JP | 2006018645 A | 1/2006 |
| JP | 2006-120153 A | 5/2006 |
| JP | 2006-139669 A | 6/2006 |
| JP | 2008-508600 A | 3/2008 |
| JP | 2008-518330 A | 5/2008 |
| JP | 2013222229 A | 10/2013 |
| JP | 2014071514 A | 4/2014 |
| KR | 1998-0032331 A | 7/1998 |
| KR | 10-2004-0095410 A | 11/2004 |
| KR | 10-2006-0031600 A | 4/2006 |
| KR | 10-2006-0091321 A | 8/2006 |
| KR | 10-2008-0084156 A | 9/2008 |
| WO | 1997/020274 A1 | 6/1997 |
| WO | 9914655 A1 | 3/1999 |
| WO | WO 99/54807 A1 | 10/1999 |
| WO | WO 00/08757 A1 | 2/2000 |
| WO | WO 02/46903 A1 | 6/2002 |
| WO | WO 02/082418 A2 | 10/2002 |
| WO | WO 02/093542 A1 | 11/2002 |
| WO | WO 03/052626 A1 | 6/2003 |
| WO | 2004/023450 A1 | 3/2004 |
| WO | WO 2004/021166 A1 | 3/2004 |
| WO | WO 2004/040481 A1 | 5/2004 |
| WO | 2005/029308 A2 | 3/2005 |
| WO | 2005/029353 A1 | 3/2005 |
| WO | WO 2005/036416 A2 | 4/2005 |
| WO | WO 2005/041020 | 5/2005 |
| WO | WO 05/074268 A1 | 8/2005 |
| WO | WO 2005/106684 A1 | 11/2005 |
| WO | WO 2006/003591 A2 | 1/2006 |
| WO | WO 2006/020304 A2 | 2/2006 |
| WO | WO 2006/020305 A2 | 2/2006 |
| WO | 2006042417 A1 | 4/2006 |
| WO | 2006/047697 A2 | 5/2006 |
| WO | 2007089766 A2 | 8/2007 |
| WO | 2008/030972 A1 | 3/2008 |
| WO | WO 2008/030874 A1 | 3/2008 |

(56) References Cited

FOREIGN PATENT DOCUMENTS

| WO | WO 2008/030976 A2 | 3/2008 |
|---|---|---|
| WO | WO 2008/086303 A1 | 7/2008 |

OTHER PUBLICATIONS

Notice of Allowance received for Korean Patent Application No. 10-2013-7028362, dated Aug. 24, 2015, 5 pages (2 pages of English Translation and 3 pages of Official Copy).
Office Action received for Australian Patent Application No. 2014262258, dated Jul. 13, 2015, 4 pages.
Office Action received for Chinese Patent Application No. 201310136787.X, dated Jun. 1, 2015, 19 pages (5 pages of English Translation and 14 pages of Official Copy).
Office Action received for Korean Patent Application No. 10-2014-7023012, dated Jun. 30, 2015, 6 pages (2 pages of English Translation and 4 pages of Official Copy).
Notice of Allowance received for U.S. Appl. No. 12/981,433, dated Sep. 27, 2013, 6 pages.
Arons, Barry Michael., "The Audio-Graphical Interface to a Personal Integrated Telecommunications System", Thesis Submitted to the Department of Architecture at the Massachusetts Institute of Technology, Jun. 1984, pp. 1-88.
Björk et al., "WEST: A Web Browser for Small Terminals", Proceedings of the 12th Annual ACM Symposium on User Interface Software and Technology, Nov. 7-10, 1999, pp. 187-196.
CNET, "Video:Create Custom Widgets with Web Clip", CNET News, Available at: <http://news.cnet.com/1606-2-6103525 .html>, Aug. 8, 2006, 3 pages.
Coleman, David W., "Meridian Mail Voice Mail System Integrates Voice Processing and Personal Computing", Speech Technology, vol. 4, No. 2, Mar./Apr. 1988, pp. 84-87.
Fingerworks, Inc., "Installation and Operation Guide for igesture Products w/Keys", available on:<www.fingerworks.com>, 2002, 10 pages.
Microsoft Corporation, "Microsoft Office Word 2003 (SP2)", SP3 as of 2005, pp. MSWord 2003 Figures 1-5, 1983-2003., 5 pages.
Microsoft Corporation, "Microsoft Word 2000 (9.0.2720)", MSWord Figures 1-5, 1999, 5 pages.
Myers, Brad A., "Shortcutter for Palm", available at <http://www.cs.cmu.edu/~pebbles/v5/shortcutter/palm/index.html>, retrieved on Jun. 18, 2014, 10 pages.
Northern Telecom, "Meridian Mail PC User Guide", 1988, 17 Pages.
Opera Software, "Download the Opera Mobile™ Browser", Available at <http://www.opera.com/products/mobile/products/>, retrieved on Oct. 19, 2006, 5 pages.
Opera Software, "Opera 7.60 for Series 60 Mobile", Available at <http://jp.opera.com/support/tutorials/s60/760/O760manual.pdf>, 2009, 14 pages.
Opera Software, "Opera 8.5 Beta 2 for Windows Mobile, Pocket PC", Available at <http://www.opera.com/products/mobile/products/winmobileppc>, retrieved on Apr. 5, 2006, 2 pages.
Opera Software, "Opera 8.5 for S60 Phones—Get the Full Internet Experience on Your Mobile Phone", Available at <http://www.symbian-freak.com/news/1105/opera.htm>, Oct. 14, 2005, 3 pages.
Opera Software, "Opera for Mobile, The Full Web Anytime, Anywhere", Available at <www.opera.com/mobile>, Jan. 2006, 7 pages.
Opera Software, "Opera for S60 Tutorial", Available at <http://www.xmarks.com/site/www.opera.com/support/tutorials/s60/>, retrieved on Apr. 5, 2006, 5 pages.
Opera Software, "Opera for Windows Mobile Smartphone 2003 Tutorial", Available at <http://www.opera.com/support/tutorials/winmobile>, retrieved on Apr. 5, 2005, 4 pages.
Opera Software, "The New Opera Browser for Series 60 Features Zoom and Password Manager", Press Releases Database, Available at <http://pressreleases.techwhack.com/1334/1411-opera-browser-features-zoom-and-password>, Nov. 14, 2005, 3 pages.
Raman, T., "Eyes-Free User Interaction", Google Research Available at <http://emacspeak.sf.net/raman>, Feb. 9, 2009, 25 pages.
Schmandt et al., "A Conversational Telephone Messaging System", IEEE Transactions on Consumer Electronics, vol. CE-30, Aug. 1984, pp. xxi-xxiv.
Schmandt et al., "Phone Slave: A Graphical Telecommunications Interface", Proceedings of the SID, vol. 26, No. 1, 1985, 4 pages.
Schmandt et al., "Phone Slave: A Graphical Telecommunications Interface", Society for Information Display, International Symposium Digest of Technical Papers, Jun. 1984, 4 pages.
Tidwell, J, "Animated Transition", from Designing Interfaces, O'Reilly Media, Inc., Nov. 2005, 2 pages.
Final Office Action received for U.S. Appl. No. 11/850,638, dated Feb. 4, 2014, 23 pages.
International Preliminary Report on Patentability received for PCT Patent Application No. PCT/US2007/077638, dated Mar. 10, 2009, 7 pages.
Non Final Office Action received for U.S. Appl. No. 13/464,454, dated Jul. 9, 2012, 13 pages.
Notice of Allowance received for U.S. Appl. No. 13/464,454, dated Oct. 29, 2012, 5 pages.
Notice of Allowance received for U.S. Appl. No. 13/464,454, dated May 1, 2013, 6 pages.
International Preliminary Report on Patentability received for PCT Patent Application No. PCT/US2007/088893, dated Jul. 7, 2009, 8 pages.
Notice of Allowance received for Chinese Patent Application No. 201210114287.1, dated Mar. 27, 2015, 4 pages (Official Copy only).(See Communication under 37 CFR § 1.98(a) (3)).
Office Action received for Chinese Patent Application No. 201310136453.2, dated Apr. 21, 2015, 12 pages (3 pages of English Translation and 9 pages of Official Copy).
Notice of Allowance received for Korean Patent Application No. 10-2011-7026453, dated Apr. 10, 2015, 3 pages (Official Copy only).(See Communication under 37 CFR § 1.98(a) (3)).
*Apple Inc.* vs. *Samsung Electronics Co. Ltd. et al.*, Judgment in Interlocutory proceeding, Case No. 396957/KG ZA 11-730, civil law sector, Aug. 24, 2011, pp. 1-65.
*Apple Inc.* vs. *Samsung Electronics Co. Ltd., et al.*, Samsung's Motion To Supplement Invalidity Contentions, Case No. 11-cv-01846-LHK, filed Jan. 27, 2012 together with Exhibit 6, 47 pages.
*Apple Inc.* vs. *Samsung Electronics Co. Ltd., et al.*, Samsung's Patent Local Rule 3-3 and 3-4 Disclosures, Case No. 11-cv-01846-LHK, dated Oct. 7, 2011, together with Exhibits G-1 through G-7 and Exhibit H, 287 pages.
HTC Europe Co. Ltd and Apple Inc. Invalidity Claim dated Apr. 5, 2012, together with annexes, 12 pages.
HTC Europe Co. Ltd and Apple Inc. invalidity Claim dated Jul. 29, 2011, together with amended Particulars of Claim and amended Grounds of Invalidity, 22 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
Notice of Appeal in Expedited Appeal in Summary Proceedings dated Sep. 14, 2011, pp. 1-51.
Pleading notes Mr B.J. Berghuis van Woortman, in matter of *Apple Inc.* vs *Samsung Electronics*, Case No. KG ZA 11-730 and KG ZA 11-731, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
*Samsung Electronics GmbH* vs *Apple Inc.*, "List scrolling and document translation, scaling and rotation on a touch-screen display", Opposition dated Jan. 30, 2012, 27 pages.
*Samsung Electronics* vs *Apple Inc.*, Statement of Defense Also Counterclaim, Case No. KG ZA 2011-731, Jul. 20, 2011, 48 pages.
*Samsung Electronics* vs *Apple Inc.*, Statement of Defense Also Counterclaim, Case No. KG ZA 2011-730, Jul. 20, 2011, 44 pages.
International Preliminary Report on Patentability received for PCT Patent Application No. PCT/US2007/077644, dated Mar. 10, 2009, 11 pages.

(56) References Cited

OTHER PUBLICATIONS

International Preliminary Report on Patentability received for PCT Patent Application No. PCT/US2007/077773, dated Mar. 10, 2009, 6 pages.
International Preliminary Report on Patentability received for PCT Patent Application No. PCT/US2007/088879, dated Jul. 7, 2009, 7 pages.
International Search Report and Written Opinion received for PCT Patent Application No. PCT/US2010/062307, dated Apr. 5, 2011, 13 pages.
Decision to Refusal received from European Patent Application No. 07814690.9, dated Jun. 11, 2012, 13 pages.
Decision to Grant received for European Patent Application No. 07841980.1, dated Mar. 11, 2013, 10 pages.
Office Action received for European Patent Application No. 09171787.6, dated Jan. 11, 2011, 1 page.
Office Action received for European Patent Application No. 09700007.9, dated Nov. 26, 2010, 5 pages.
Grant of Patent received for Taiwan Patent Application No. 097100075, dated Apr. 11, 2013, 3 pages.
Office Action received for Korean Patent Application No. 10-2011-7026453, dated Apr. 26, 2013, 3 pages.
Office Action received for Korean Patent Application No. 10-2011-7026453, dated Feb. 17, 2014, 9 pages (4 pages of English Translation and 5 pages of Official Copy).
Office Action received for Korean Patent Application No. 10-2013-7028362, dated Dec. 16, 2014, 5 pages (2 pages of English Translation and 3 pages of official copy).
Office Action received for Korean Patent Application No. 10-2013-7028362, dated Feb. 17, 2014, 4 pages (1 page of English Translation and 3 pages of Official Copy).
Office Action received for Korean Patent Application No. 10-2014-7023012, dated Dec. 1, 2014, 3 pages. (Official Copy only) (See Communication under 37 CFR § 1.98(a) (3)).
Office Action received for German Patent Application No. 112009000003.7, dated Aug. 10, 2010.
Office Action received for European Patent Application No. 12169786.6, dated Aug. 28, 2013, 5 pages.
Summons to Attend Oral Proceeding received for European Patent Application No. 12169786.6, mailed on Jul. 31, 2014, 3 pages.
Extended European Search Report received for European Patent Application No. 12174677.0, dated Aug. 10, 2012, 11 pages.
Office Action received for European Patent Application No. 12174677.0, dated Aug. 28, 2013, 3 pages.
Notice of Allowance received for Canadian Patent Application No. 2,662,134, dated Dec. 10, 2014, 1 page.
Office Action received for Chinese Patent Application No. 200910175852.3, dated Jun. 3, 2014, 4 pages (official copy only) (See Communication under 37 CFR § 1.98(a) (3)).
Notice of Allowance received for Chinese Patent Application No. 200780052019.9, dated Mar. 19, 2014, 4 pages (official copy only) (See Communication under 37 CFR § 1.98(a) (3)).
Notice of Allowance received for Japanese Patent Application No. 2009-527566, dated Oct. 4, 2013, 3 pages.
Notice of Acceptance received for Australian Patent Application No. 2011265564, dated Aug. 4, 2014, 2 pages.
Office Action received for Australian Patent Application No. 2011265564, dated Jun. 14, 2013, 4 pages.
Office Action received for Chinese Patent Application No. 201210114287.1, dated Jan. 8, 2014, 13 pages (4 pages of English Translation and 9 pages of Official copy).
Office Action received for Chinese Patent Application No. 201210114287.1, dated Sep. 12, 2014, 9 pages (4 pages of English Translation and 5 pages of Official Copy).
Notice of Allowance received for Japanese Patent Application No. 2013-080820, dated Aug. 11, 2014, 3 pages (Official Copy only) (See Communication under 37 CFR § 1.98(a) (3)).
Office Action received for Japanese Patent Application No. 2013-080820, dated Feb. 7, 2014, 7 pages (4 pages of English Translation and 3 pages of Official Copy).

Notice of Allowance received for Japanese Patent Application No. 2013-229756, dated Oct. 24, 2014, 3 pages (Official Copy only) (See Communication under 37 CFR § 1.98(a) (3)).
Office Action received for Chinese Patent Application No. 200780052019.9, dated Jul. 30, 2013, 8 pages.
Notice of Allowance received for U.S. Appl. No. 11/850,638, dated May 13, 2014, 5 pages.
Final Office Action received for U.S. Appl. No. 11/968,067, dated May 13, 2011, 16 pages.
Final Office Action received for U.S. Appl. No. 12/042,299, dated Jul. 8, 2011, 8 pages.
Non-Final Office Action received for U.S. Appl. No. 12/042,299, dated Jan. 4, 2011, 9 pages.
Non-Final Office Action received for U.S. Appl. No. 12/981,433, dated Oct. 11, 2012, 29 pages.
Notice of Allowance received for U.S. Appl. No. 12/981,433, dated Feb. 3, 2014, 5 pages.
Notice of Allowance received for U.S. Appl. No. 12/981,433, dated Feb. 19, 2013, 5 pages.
Summons to attend oral proceedings received for Appeal No. T0143/12-3.5.05 in European Patent Application No. 09171787.6, mailed on Sep. 11, 2015, 2 pages.
Office Action received for Japanese Patent Application No. 2014-184473, dated Oct. 5, 2015, 6 pages (3 pages of English Translation and 3 pages of Official Copy).
Notice of Acceptance received for Australian Patent Application No. 2014262258, dated Apr. 1, 2016, 2 pages.
Office Action received for Chinese Patent Application No. 201310136453.2, dated Feb. 14, 2016, 28 pages (20 pages of English Translation and 8 pages of Official copy).
Decision to Refusal received for European Patent Application No. 07869929.5, dated Jun. 4, 2012, 8 pages.
Decision to Grant received for European Patent Application No. 07841980.1, dated Aug. 1, 2013, 3 pages.
Office Action received for Japanese Patent Application No. 2014-238083, dated Feb. 26, 2016, 5 pages (English Translation only).
Office Action received for European Patent Application No. 07814690.9, dated Jun. 21, 2010, 5 pages.
Office Action received for European Patent Application No. 07814690.9, dated Oct. 19, 2010, 8 pages.
Summons to Attend Oral Proceedings received for European Patent Application No. 07814690.9, mailed on Nov. 22, 2011, 4 pages.
Office Action received for European Patent Application No. 07841980.1, dated Feb. 23, 2012, 5 pages.
Summons to Attend Oral Proceedings received for European Patent Application No. 07841980.1, mailed on Sep. 28, 2012, 8 pages.
Office Action received for European Patent Application No. 07869929.5, dated Dec. 27, 2010, 6 pages.
Summons to Attend Oral Proceedings received for European Patent Application No. 07869929.5, mailed on Dec. 13, 2011, 6 pages.
Summons to Attend Oral Proceedings received for European Patent Application No. 07869929.5, mailed on Jan. 23, 2012, 1 page.
Decision to Refusal received for European Patent Application No. 09171787.6, dated Dec. 14, 2011, 22 pages.
Extended European Search Report (includes Partial European Search Report and European Search Opinion) received for European Patent Application No. 09171787.6, dated Jan. 26, 2010, 6 pages.
Office Action received for European Patent Application No. 09171787.6, dated Jul. 12, 2011, 5 pages.
Summons to attend oral proceedings received for Appeal No. T1043/12-3.5.05 in European Patent Application No. 09171787.6, mailed on Sep. 11, 2015, 8 pages.
Office Action received for Taiwan Patent Application No. 097100075, dated Dec. 29, 2011, 5 pages (English Translation only).
Notice of Allowance received for Korean Patent Application No. 10-2009-7007064, dated Sep. 30, 2011, 2 pages (Official Copy only) (see attached 37 CFR § 1.98(a) (3)).
Notice of Allowance received for Korean Patent Application No. 10-2009-7007067, dated Dec. 1, 2011, 2 pages (Official Copy only) (see attached 37 CFR § 1.98(a) (3)).
Office Action received for Korean Patent Application No. 10-2009-7007067, dated Aug. 30, 2011, 2 pages (English Translation only).

(56) References Cited

OTHER PUBLICATIONS

Office Action received for Korean Patent Application No. 10-2009-7007067, dated Nov. 12, 2010, 3 pages (English Translation only).
Notice of Allowance received for Korean Patent Application No. 10-2011-7019633, dated May 18, 2012, 2 pages (Official Copy only) (see attached 37 CFR § 1.98(a) (3)).
Final Office Action received for U.S. Appl. No. 11/620,647, dated Dec. 23, 2010, 21 pages.
Non-Final Office Action received for U.S. Appl. No. 11/620,647 dated Jun. 24, 2010, 19 pages.
Non-Final Office Action received for U.S. Appl. No. 11/620,647 dated Nov. 17, 2009, 20 pages.
Non-Final Office Action received for U.S. Appl. No. 11/620,647, dated Oct. 13, 2011, 23 pages.
Notice of Allowance received for U.S. Appl. No. 11/620,647 dated Mar. 2, 2012, 8 pages.
Final Office Action received for U.S. Appl. No. 11/850,008, dated Dec. 29, 2010, 14 pages.
Non-Final Office Action received for U.S. Appl. No. 11/850,008, dated Aug. 2, 2010, 14 pages.
Notice of Allowance received for U.S. Appl. No. 11/850,008, dated Mar. 11, 2011, 7 pages.
Non-Final Office Action received for U.S. Appl. No. 11/850,013, dated Jun. 11, 2010, 32 pages.
Notice of Allowance received for U.S. Appl. No. 11/850,013, dated Oct. 20, 2010, 20 pages.
Final Office Action received for U.S. Appl. No. 11/850,638, dated Feb. 8, 2011, 14 pages.
Final Office Action received for U.S. Appl. No. 11/850,638, dated May 15, 2012, 16 pages.
Non-Final Office Action received for U.S. Appl. No. 11/850,638, dated Jan. 17, 2012, 15 pages.
Non-Final Office Action received for U.S. Appl. No. 11/850,638, dated Jun. 27, 2013, 16 pages.
Non-Final Office Action received for U.S. Appl. No. 11/850,638, dated Oct. 26, 2010, 17 pages.
Final Office Action received for U.S. Appl. No. 11/961,773, dated Nov. 2, 2011, 12 pages.
Final Office Action received for U.S. Appl. No. 11/961,773, dated Nov. 29, 2012, 15 pages.
Non-Final Office Action received for U.S. Appl. No. 11/961,773, dated Apr. 15, 2011, 21 pages.
Non-Final Office Action received for U.S. Appl. No. 11/961,773, dated May 10, 2012, 14 pages.
Non-Final Office Action received for U.S. Appl. No. 11/968,067, dated Oct. 15, 2010, 13 pages.
Office Action received for German Patent Application No. 112007002107.1, dated Jun. 7, 2010, 3 pages (English Translation only).
Decision to Refuse Patent Application received for European Patent Application No. 12169786.6, dated Feb. 26, 2015, 16 pages.
Extended European Search Report (includes Partial European Search Report and European Search Opinion) received for European Patent Application No. 12169786.6, dated Jul. 11, 2012, 10 pages.
Final Office Action received for U.S. Appl. No. 13/155,304 dated Feb. 7, 2013, 12 pages.
Non-Final Office Action received for U.S. Appl. No. 13/155,304, dated Sep. 5, 2012, 11 pages.
Notice of Allowance received for U.S. Appl. No. 13/155,304, dated Jul. 25, 2013, 10 pages.
Office Action received for Australian Patent Application No. 2007289019, dated Jul. 2, 2009, 3 pages.
Office Action received for Australian Patent Application No. 2007289019, dated Oct. 7, 2009, 2 pages.
Notice of Acceptance received for Australian Patent Application No. 2007292383, dated Jan. 4, 2012, 3 pages.
Office Action received for Australian Patent Application No. 2007292383, dated Dec. 22, 2011, 2 pages.
Office Action received for Australian Patent Application No. 2007292383, dated Mar. 24, 2010, 2 pages.
Office Action received for Australian Patent Application No. 2007292383, dated May 12, 2011, 2 pages.
Decision to Grant received for Chinese Patent Application No. 200780001140.9, dated Feb. 3, 2012, 4 pages (2 pages of English Translation and 2 pages of Official copy).
Office Action received for Chinese Patent Application No. 200780001140.9, dated Jan. 15, 2010, 5 pages (English Translation only).
Office Action received for Chinese Patent Application No. 200780001140.9, dated Jun. 10, 2011, 7 pages (English Translation only).
Notice of allowance received for Chinese Patent Application No. 200780041222.6, dated Feb. 4, 2013, 2 pages (see attached 37 CFR § 1.98(a) (3)).
Office Action received for Chinese Patent Application No. 200780041222.6, dated Feb. 29, 2012, 6 pages (3 pages of English Translation and 3 pages of Official copy).
Office Action received for Chinese Patent Application No. 200780041222.6, dated Jul. 25, 2012, 3 pages (English Translation only).
Office Action received for Chinese Patent Application No. 200780041222.6, dated Oct. 13, 2010, 10 pages (English Translation only).
Office Action received for Chinese Patent Application No. 200780052019.9, dated Jan. 22, 2013, 15 pages (8 pages of English Translation and 7 pages of Official copy).
Office Action received for Chinese Patent Application No. 200780052019.9, dated Feb. 29, 2012, 6 pages (3 pages of English Translation and 3 pages of Official Copy).
Office Action received for Australian Patent Application No. 2009100760, dated Sep. 28, 2009, 2 pages.
Office Action received for Chinese Patent Application No. 200910175852.3, dated Apr. 24, 2012, 10 pages (6 pages of English Translation and 4 pages of Official Copy).
Office Action received for Chinese Patent Application No. 200910175852.3, dated Jun. 2, 2011, 6 pages (English Translation only).
Office Action received for Japanese Patent Application No. 2009-527541, dated Dec. 7, 2012, 10 pages.
Office Action received for Japanese Patent Application No. 2009-527541, dated May 21, 2012, 3 pages (English Translation only).
Office Action received for Japanese Patent Application No. 2009-527541, dated Sep. 26, 2011, 3 pages (English Translation only).
Office Action received for Japanese Patent Application No. 2009-527566, dated Aug. 15, 2011, 3 pages (English Translation only).
Office Action received for Japanese Patent Application No. 2009-527566, dated Sep. 21, 2012, 3 pages (English Translation only).
Certificate of Examination received for Australian Patent Application No. 2011101190, dated Nov. 23, 2011, 1 page.
Office Action received for Japanese Patent Application No. 2014-184473, dated Oct. 5, 2015, 6 pages (3 pages of English translation and 3 page of Official copy).
Agarwal Amit, "iTunesInlineVideo", Digital Inspiration—The Tech Guide, available online at <http://labnol.blogspot.com/2006_09_17_labnol_archive.html>, 2006, 27 pages.
Ahmad et al., "Content-Based Image Retrieval on Mobile Devices", Proceedings of SPIE—IS&T Electronic Imaging, vol. 5684, 2005, pp. 255-264.
Alam et al., "Web Document Manipulation for Small Screen Devices: A Review", Available at <http://www.csc.liv.ac.uk/~wda2003/Papers/Section_II/Paper_8.pdf>, 2003, pp. 33-36.
Alejandre Suzanne, "Graphing Linear Equations", available at <http://mathforum.org/alejandre/palm/times.palm.html>, retrieved on Jun. 12, 2006, 3 pages.
Apparao et al., "Level 1 Document Object Model Specification", W3C Working Draft, available at <http://www.w3.org/TR/WD-DOM/>, Jul. 20, 1998, 3 pages.
Baudisch et al., "Collapse-to-Zoom: Viewing Web Pages on Small Screen Devices by Interactively Removing Irrelevant Content", Microsoft Research Available at <http://www.patrickbaudisch.com/publications/2004-Baudisch-UIST04-CollapseToZoom.pdf>, Oct. 27, 2004, 4 pages.

(56) References Cited

OTHER PUBLICATIONS

Bitstream®, "ThunderHawk Pocket PC Edition for End Users", available at <http://www.bitstream.com/wireless/products/pocketpc/faq_using.html>, retrieved on Jun. 12, 2006, 4 pages.
Bos et al., "3 Conformance: Requirements and Recommendations", Cascading Style Sheets, level 2 CSS2 Specification, W3C Recommendation, available at <http://www.w3.org/TR/CSS21/conform.html#doctree>, May 12, 1998, 6 pages.
Buyukkokten et al., "Power Browser: Efficient Web Browsing for PDAs", Proceedings of the SIGCHI conference on Human Factors in Computing Systems, Dec. 27, 2000, 8 pages.
Chen et al., "A Novel Navigation and Transmission Technique for Mobile Handheld Devices", Technical Report CSE-2003-1, Department of Computer Science, University of California at Davis, 2003, 8 pages.
Chen et al., "Detecting Web Pages Structure for Adaptive Viewing on Small Form Factor Devices", Proceedings of the 12th international conference on World Wide Web, 2003, 9 pages.
Chen et al., "DRESS: A Slicing Tree Based Web Page Representation for Various Display Sizes", Microsoft Researach, Technical Report, Nov. 16, 2002, 9 pages.
CNET, "Fujitsu LifeBook B6110D", Reviews, Nov. 24, 2005, 2 pages.
Cooper Alan, "The Inmates Are Running the Asylum", Sams Publishing, Mar. 23, 1999, pp. 138-147.
Eyemodule Springboard Compatible, "Turn Your Handspring™ Visor™ Handheld into a Digital Camera", Users Manual, 2000, 9 pages.
Fingerworks Forums, "Is the Multitouch Lemur?", available at <http://64233.167.104/search?q=cache:sjVdtyFBvRMJ:forums.finger, Dec. 24, 2004, 2 pages.
Fingerworks Inc., "Installation and Operation Guide for the TouchStream and TouchStream LP", available at <http://www.fingerworks.com>, 2002, pp. 1-25.
Fingerworks Inc., "Quick Reference Guide for iGesture Products", available at <http://www.fingerworks.com>, 1999-2002, 2 pages.
Fingerworks Inc., "Quick Reference Guide for TouchStream ST/LP", available at <http://www.fingerworks.com>, 2001-2002, 4 pages.
Fingerworks, Inc., "TouchStream LP Silver", available at <http://www.fingerworks.com>, Apr. 27, 2005, 18 pages.
Fling Brian, "Designing for Mobile, Bringing Design Down to Size", Blue Flavor, Jul. 2006, 103 pages.
Gears Leigh, "Orange SPV C600 Review", available at <http://www.coolsmartphone.com/article569.html>, retrieved on Apr. 14, 2006, 57 pages.
Getgreg, "Jeff Han's Multiple Touch Point Display, the Stuff Dreams are Made of", available at <http://www.theyshoulddothat.com/2006/08/jeff_hanns_multiple_touch_poin.html>, retrieved on Aug. 16, 2006, 2 pages.
Guan et al., "Zoom Selector: A Pen-based Interaction Technique for Small Target Selection", Transactions of the Information Processing Society of Japan, vol. 45, No. 8, Aug. 2004, pp. 2087-2097.
Han Jeff, "Talks Jeff Han: Unveiling the Genius of Multi-touch Interface Design", Ted Ideas Worth Spreading, available at <http://www.ted.com/index.php/talks/view/id/65>, Aug. 2006, 1 page.
Hart Kim, "Rewriting the Web for Mobile Phones", washingtonpost.com, available at <http://www.washingtonpost.com/wp-dyn/content/article/2006/07/25/AR2006072501517_pf.html>, Jul. 26, 2006, 2 pages.
Hinckley et al., "Input/Output Devices and Interaction Techniques", CRC Press, Nov. 2004, pp. 1-79.
Holmquist Lars E., "The Zoom Browser Showing Simultaneous Detail and Overview in Large Documents", available at<http://www.hb.se/bhs/ith/3-98/leh.htm>, Human IT, 1998, pp. 1-12.
Karlson et al., "AppLens and LaunchTile: Two Designs for One-Handed Thumb Use on Small Devices", Powerpoint Presentation, CHI 2005, 17 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Khella et al., "Pocket PhotoMesa: A Zoomable Image Browser for PDAs", Proceedings of the 3rd International Conference on Mobile and Ubiquitous Multimedia, available at <http://delivery.acm.org/10.1145/1060000/1052384/p19-khella.pdf?key1=1052384&key2=2419987911&coll=GUIDE&dl=GUIDE&CFID=47073625&CFTOKEN=65767142>, Oct. 29, 2004, pp. 19-24.
Kinoma, "Kinoma Player 4 EX Documentation", vailable at <http://replay.waybackmachine.org/20061101175306/http://www.kinoma.com/index/pd-player-4>, archived on Nov. 1, 2006, 28 pages.
Laakko et al., "Adapting Web Content to Mobile User Agents", IEEE Internet Computing, vol. 9, No. 2, Mar./Apr. 2005, pp. 46-53.
Landragin Frédéric, "The Role of Gesture in Multimodal Referring Actions", Proceedings of the 4th IEEE International Conference on Multimodal Interfaces, available at <http://ieeexplore.iee.org/ie15/8346/26309/01166988pdf?arnumber=1166988>, 2002, 6 pages.
Lie Håkon W., "Cascading Style Sheets", University of Osloensis, MDCCCXI, 2005, pp. 243-247.
Microsoft Word, "Example of Scrolling Pages in Word 2003", 2003, 3 pages.
Milic-Frayling et al., "SmartView: Enhanced Document Viewer for Mobile Devices", Microsoft Technical Report, available at <ftp://ftp.research.microsoft.com/pub/tr/tr-2002-114.pdf>, Nov. 15, 2002, 9 pages.
Milic-Frayling et al., "SmartView: Flexible Viewing of Web Page Contents", Proceedings of the Eleventh International World Wide Web Conference, available at <http://www2002.org/CDROM/poster/172/>, May 11, 2002, 4 pages.
Oliver Dick, "Adding Multimedia to Your Web Site", Chapter 22, Web Publishing Professional Reference Edition, available online at <http://www.ssuet.edu.pk/taimoor/books/1-57521-198-X/index.htm>, 1997, 14 pages.
Palme et al., "MIME Encapsulation of Aggregate Documents, such as HTML", Network Working Group, 1999, 24 pages.
Palmone, "Your Mobile Manager", Chapter 2, LifeDrive™ User's Guide, available at <http://www.palm.com/us/support/handbooks/lifedrive/en/lifedrive_handbook.pdf >, 2005, 23 pages.
International Search Report and Written Opinion received for PCT Patent Application No. PCT/US2007/077638, dated Feb. 19, 2008, 9 pages.
International Search Report and Written Opinion received for PCT Patent Application No. PCT/US2007/077644, dated May 30, 2008, 18 pages.
Invitation to pay additional fees received for PCT Patent Application No. PCT/US2007/077644, mailed on Jan. 23, 2008, 10 pages.
International Search Report and Written Opinion received for PCT Patent Application No. PCT/US2007/077773, dated Jan. 15, 2008, 8 pages.
International Search Report and Written Opinion received for PCT Patent Application No. PCT/US2007/088879, dated Jun. 30, 2008, 8 pages.
International Search Report and Written Opinion received for PCT Patent Application No. PCT/US2007/088893, dated Jul. 11, 2008, 10 pages.
International Search Report and Written Opinion received for PCT Patent Application No. PCT/US2008/050430, dated Sep. 1, 2008, 13 pages.
Invitation to Pay Additional Fees received for PCT Patent Application No. PCT/US2008/050430, mailed on Jun. 27, 2008, 7 pages.
Raman et al., "Application-Specific Workload Shaping in Multimedia-Enabled Personal Mobile Devices", CODES+ISSS, Oct. 22-25, 2006, pp. 4-9.
Robie Jonathan, "What is the Document Object Model?", Texcel Research, available at <http://www.w3.org/TR-DOM/introduction.html>, 2006, 5 pages.
Rohrer Tim, "Metaphors We Compute by: Bringing Magic into Interface Design", available online at <http://www.uoregon.edu/-uophil/metaphor/gui4web.htm>, retrieved on Jun. 13, 2006, 7 pages.
Roto et al., "Minimap—A Web Page Visualization Method for Mobile Phones", Proceedings of the SIGCHI Conference on Human Factors in Computing Systems, Apr. 22-27, 2006, pp. 35-44.
Salmre I, "Characteristics of Mobile Applications", Chapter 2, Salmre_02.fm, Dec. 20, 2004, pp. 19-36.

(56) References Cited

OTHER PUBLICATIONS

Schreiner Tony, "High DPI in IE: Tip & Mystery Solved", Tony Schreiner's Blog, available at <http://blogs.msdn.com/tonyschr/archive/2004/05/05/126305.aspx>, May 2004, 2 pages.
Stampfli Tracy, "Exploring Full-Screen Mode in Flash Player 9", available online at <http://www.adobe.com/devnet/flashplayer/articles/full_screen_mode.html>, Nov. 14, 2006, 2 pages.
Stanek et al., "Video and Animation Plug-Ins", Chapter 9, Web Publishing Professional Reference Edition, available online at <http://www.ssuet.edu.pk/taimoor/books/1-57521-198-X/index.htm>, 1997, 18 pages.
Surfin'safari, "XUL", available online at <http://weblogs.mozillazine.org/hyatt.archives/2003_10.html>, Oct. 2003, 7 pages.
Tidwell Jenifer, "Animated Transition", Designing Interfaces, Patterns for effective Interaction Design, First Edition, Nov. 2005, 4 pages.
Versiontracker, "Photogather—7.2.6. Hi-res Image Viewer & Editor for Palm", available online at <http://www.versiontracker.com/dyn/moreinfo/palm/4624>, retrieved on Jun. 12, 2006, 5 pages.
w3schools.com, "Playing Videos On The Web", available online at <http://www.w3schools.com/media/media_browservideos.asp?out=print>, 2006, 3 pages.
w3schools.com, "Multimedia Video Formats", available online at <http://www.w3sschools.com/media/media_videoformats.asp?output=print>, 2006, 2 pages.
w3schools.com, "Playing QuickTime Movies", available online at <http://www.3schools.com/media/media_quicktime.asp?output=print>, 2006, 2 pages.
Warabino et al., "Video Transcoding Proxy for 3Gwireless Mobile Internet Access", IEEE Communications Magazine, vol. 38, No. 10, Oct. 2000, pp. 66-71.
Wave Technologiesinternational Inc., "Certified Internet Webmaster Foundations Study Guide", A Thomson Learning Company, CIWF-SGMN-0101A, copyright 1988-2000, 88 pages.
Weblogs, "An Overview of WebCore", Chapter 2, WebCore Documentation, available at <http:lweblogs.mozillazine.org/hyatt/WebCore/chapter2.html>, 2006, 3 pages.
Weblogs, "Downloading and Building WebCore", Chapter 1, WebCore Documentation, available at <http://weblogs.mozillazine.org/hyatt/WebCore/chapter1.html>, 2006, 2 pages.
webmasterworld.com, "Page Zooming with IE-Hidden Feature!", available at <http://www.webmasterworld.com/forum83/4179.htm>, Jul. 2004, 7 pages.
Wikipedia, "Comparison of Layout Engines", The free encyclopedia, available at <http://en.wikipedia.org/wiki/Comparison_of_layout_engines>, 2006, 3 pages.
Wikipedia, "History of YouTube", The Free Encyclopedia, available at <http://en.wikipedia.org/wiki/History_of_YouTube>, retrieved on Mar. 15, 2011, 4 pages.
Wikipedia, "KDE", The free encyclopedia, available at <http://en.wikipedia.org/wiki/KDE>, 2006, 9 pages.
Wikipedia., "KHTML", The free encyclopedia, available at <http://en.wikipedia.org/wiki/KHTML>, 2006, 3 pages.
Wikipedia, "List of Layout Engines", The Free Encyclopedia, available at <http://en.wikipedia.org/wiki/List_of_layout_engines>, 2006, 1 page.
Williams Martyn, "LG's Cell Phone Can Pause Live TV", PC World, Oct. 11, 2005, 2 pages.
Wobbrock et al., "WebThumb: Interaction Techniques for Small-Screen Browsers", UIST'02, Paris France, Oct. 27-30, 2002, pp. 205-208.
Xiao et al., "Slicing*-Tree Based Web Page Transformation for Small Displays", International Conference on Information and Knowledge Management, Oct. 31-Nov. 5, 2005, 2 pages.
Xie et al., "Efficient Browsing of Web Search Results on Mobile Devices Based on Block Importance Model", Microsoft Research Asia, 2005, 10 pages.
Yin et al., "Using Link Analysis to Improve Layout on Mobile Devices", Proceedings of the 13th international conference on World Wide Web, available at <http://www.iw3c2.org/WWW2004/docs/1p338.pdf>, May 17-22, 2004, pp. 338-344.
Youtube, "Broadcast Yourself", Available at <www.youtube.com>, Nov. 1, 2005, 2 pages.
Youtube, "Broadcasting Ourselves", The Official Youtube blog Available at <http://youtube-global.blogspot.in/2005_11_01_archive.html>, Nov. 15, 2005, 5 pages.
Zytronic, "Touchscreen User Manual Zytronic X-Y Controller (Serial and USB)", XP007916436, Nov. 17, 2006, pp. 1-51.
Petition for Inter Partes Review of U.S. Pat. No. 7,864,163, pp. 1-225.
Summons to Attend Oral Proceedings received for European Patent Application No. 07814690.9 issued on Feb. 1, 2016, 12 pages.
Non Final Office Action received for U.S. Appl. No. 14/205,268, dated Feb. 18, 2016, 17 pages.
Office Action Received for Chinese Patent Application No. 201310136787.X, dated Jan. 13, 2016, 28 pages (17 Pages of English Translation and 11 Pages of Official Copy).
Intention to Grant received for European Patent Application No. 07814690.9, dated Jun. 28, 2016, 7 pages.
Intention to Grant received for European Patent Application No. 12174677.0, dated May 6, 2016, 8 pages.
Notice of Allowance received for Korean Patent Application No. 10-2014-7023012, dated May 24, 2016, 5 pages (2 pages of English Translation and 3 pages of Official copy).
Office Action received for Canadian Patent Application No. 2,894,056, dated Jul. 4, 2016, 3 pages.
Office Action received for Japanese Patent Application No. 2014-184473, dated May 9, 2016, 6 pages (3 pages of English Translation and 3 pages of Official Copy).
Notice of Allowance received for U.S. Appl. No. 14/205,268, dated Feb. 13, 2017, 8 pages.
Decision to Grant received for European Patent Application No. 12174677.0, dated Sep. 29, 2016, 3 pages.
Non Final Office Action received for U.S. Appl. No. 14/493,128, dated Sep. 12, 2016, 18 pages.
Non-Final Office Action received for U.S. Appl. No. 14/205,268, dated Sep. 26, 2016, 18 pages.
Notice of Allowance received for Chinese Patent Application No. 201310136787.X, dated Aug. 19, 2016, 4 pages (2 pages of English Translation and 2 pages of Official Copy).
Final Office Action received for U.S. Appl. No. 14/493,128, dated Dec. 21, 2016, 17 pages.
Office Action received for Chinese Patent Application No. 201310136453.2, dated Nov. 8, 2016, 11 pages (3 pages of English Translation and 8 pages of Official Copy).
Summons to Oral Proceeding received for European Patent Application No. 12169786.6, mailed on Dec. 12, 2016, 9 pages.
Decision to Grant received for European Patent Application No. 07814690.9, dated Nov. 10, 2016, 3 pages.
Notice of Allowance received for Japanese Patent Application No. 2014-184473, dated Oct. 3, 2016, 3 pages (Official Copy only). {See Communication Under 37 CFR § 1.98(a) (3)).
Office Action received for Korean Patent Application No. 10-2016-7023037, dated Oct. 18, 2016, 13 pages (6 pages of English Translation and 7 pages of Official Copy).
Advisory Action received for U.S. Appl. No. 11/961,773, dated May 1, 2013, 3 pages.
Baudisch, Patrick, et al., "Halo: A Technique for Visualizing Off-Screen Locations", CHI 2003: New Horizons vol. No. 5, Apr. 5-10, 2003, pp. 481-488.
Bederson, Benjamin B., et al., "Pad++: A Zooming Graphical Interface for Exploring Alternate Interface Physics", UIST' 94 ACM, Nov. 2, 1994, pp. 17-26.
Corrected Notice of Allowance received for U.S. Appl. No. 15/619,027, dated Nov. 6, 2018, 2 pages.
Decision on Appeal received for Korean Patent Application No. 10-2016-7023037, mailed on Jun. 17, 2019, 21 pages (2 pages of English Translation and 19 pages of Official Copy).
Decision to refuse received for European Patent Application No. 12169786.6, dated Mar. 7, 2019, 12 pages.
Extended European Search Report received for European Patent Application No. 17171177.3, dated Feb. 6, 2018, 16 pages.

(56) References Cited

OTHER PUBLICATIONS

Final Office Action received for U.S. Appl. No. 11/961,773, dated May 1, 2019, 17 pages.
Irani, Pourang, et al., "Improving Selection of Off-Screen Targets with Hopping", CHI 2006 Proceedings, Multidisplay Environments, Apr. 22-27, 2006, pp. 299-308.
Kamimori, Tsutomu, "Make the website more stylish! CSS Design Right Now Started", Web Creators, vol. 51, Mdn Corporation, Mar. 1, 2006, pp. 136-139 (see communication under 37 CFR § 1.98(a)(3)).
Malak, Michael, "Adding Video To Your Web pages", Web Mechanics, Computing in Science and Engineering, May/Jun. 2000, pp. 74-77.
Marsh, Tim, et al., "Using Cinematography Conventions to Inform Guidelines for the Design and Evaluation of Virtual Off-Screen Space", available at :<https://pdfs.semanticscholar.org/763d/e2a737c7abc0adbfccb215e07607bc944535.pdf>, AAAI Technical Report SS-00-04, Jan. 1, 2000, 5 pages.
Minutes of Meetings received for European Patent Application No. 12169786.6, mailed on Mar. 5, 2019, 7 pages.
Non-Final Office Action received for U.S. Appl. No. 11/961,773, dated Apr. 2, 2018, 13 pages.
Non-Final Office Action received for U.S. Appl. No. 11/961,773, dated Sep. 24, 2019, 16 pages.
Non-Final Office Action received for U.S. Appl. No. 15/619,027, dated May 4, 2018, 15 pages.
Non-Final Office Action received for U.S. Appl. No. 15/807,283, dated Apr. 25, 2018, 12 pages.
Notice of Acceptance received for Australian Patent Application No. 2016204921, dated Jul. 10, 2017, 4 pages.
Notice of Acceptance received for Australian Patent Application No. 2017245373, dated May 1, 2019, 3 pages.
Notice of Allowance received for Canadian Patent Application No. 2,894 056, dated Jun. 4, 2018, 1 page.
Notice of Allowance received for Canadian Patent Application No. 2,986,163 dated Sep. 11, 2019, 1 page.
Notice of Allowance received for Chinese Patent Application No. 201310136453.2, dated Jun. 26, 2017, 4 pages (2 pages of English Translation and 2 pages of Official Copy).
Notice of Allowance received for Japanese Patent Application No. 2014-238083, dated Mar. 12, 2019, 3 pages (1 page of English Translation and 2 pages of Official copy).
Notice of Allowance received for Japanese Patent Application No. 2016-175843, dated Aug. 24, 2018, 4 pages (1 page of English Translation and 3 pages of Official Copy).
Notice of Allowance received for Japanese Patent Application No. 2018-178038, dated Sep. 30, 2019, 4 pages (1 page of English Translation and 3 pages of Official Copy).
Notice of Allowance received for Korean Patent Application No. 10-2017-7037416, dated Nov. 8, 2019, 5 pages (2 pages of English Translation and 3 pages of Official Copy).
Notice of Allowance received for U.S. Appl. No. 14/205,268, dated May 31, 2017, 5 pages.
Notice of Allowance received for U.S. Appl. No. 14/493,128, dated Jun. 8, 2017, 7 pages.
Notice of Allowance received for U.S. Appl. No. 14/493,128, dated Nov. 8, 2017, 7 pages.
Notice of Allowance received for U.S. Appl. No. 15/619,027, dated Oct. 24, 2018, 10 pages.
Notice of Allowance received for U.S. Appl. No. 15/807,283, dated Oct. 31, 2018, 10 pages.
Office Action issued in Korean Patent Application No. 10-2017-7037416, dated Feb. 20, 2018, 5 pages (1 page of English Translation and 4 pages of Official copy).
Office Action received for Australian Patent Application No. 2016204921, dated Mar. 24, 2017, 3 pages.
Office Action received for Australian Patent Application No. 2017245373, dated Aug. 29, 2018, 3 pages.
Office Action received for Canadian Patent Application No. 2,894,056, dated May 24, 2017, 3 pages.
Office Action received for Canadian Patent Application No. 2,986,163 dated Sep. 20, 2018, 5 pages.
Office Action received for European Patent Application No. 12169786.6 dated Jul. 17, 2017, 8 pages.
Office Action received for European Patent Application No. 17171177.3, dated Sep. 18, 2019, 5 pages.
Office Action received for Japanese Patent Application No. 2014-238083, dated Feb. 24, 2017, 5 pages (2 pages of English Translation and 3 pages of Official Copy).
Office Action received for Japanese Patent Application No. 2014-238083, dated Jul. 20, 2018, 50 pages (25 pages of English Translation and 25 pages of Official Copy).
Office Action received for Japanese Patent Application No. 2014-238083, dated Sep. 5, 2017, 6 pages (3 pages of English Translation and 3 pages of Official Copy).
Office Action received for Japanese Patent Application No. 2016175843, dated Jul. 7, 2017, 8 pages (4 pages of English Translation and 4 pages of Official Copy).
Office Action received for Japanese Patent Application No. 2016-175843, dated on May 11, 2018, 9 pages (5 pages of English Translation and 4 pages of Official Copy).
Office Action received for Korean Patent Application No. 10-2016-7023037, dated Aug. 28, 2017, 7 pages (3 pages of English Translation and 4 pages of Official Copy).
Perlin, Ken, et al., "Pad: An Alternative Approach to the Computer Interface", Courant Institute of Mathematical Sciences, 1993, pp. 57-64.
Summons to Attend Oral Proceeding received for European Patent Application No. 12169786.6, mailed on Aug. 29, 2018, 9 pages.
Summons to Attend Oral Proceeding received for German Patent Application No. 112007002107.1, mailed on Jul. 11, 2018, 12 pages (5 pages of English Translation and 7 pages of Official copy).
Summons to Attend Oral Proceedings received for European Patent Application No. 17171177.3, mailed on Jul. 26, 2019, 6 pages.
Summons to Attend Oral Proceedings received for European Patent Application No. 17171177.3, mailed on Apr. 21, 2020, 5 pages.
Summons to Oral Proceeding received for European Patent Application No. 12169786.6, mailed on Oct. 9, 2020, 15 pages.
Notice of Allowance received for Japanese Patent Application No. 2019-196279, dated Dec. 4, 2020, 4 pages (1 page of English Translation and 3 pages of Official Copy).
Office Action received for Australian Patent Application No. 2019213409, dated Jun. 19, 2020, 4 pages.
Applicant-Initiated Interview Summary received for U.S. Appl. No. 16/288,632, dated Mar. 23, 2020, 5 pages.
Final Office Action received for U.S. Appl. No. 16/288,632, dated Apr. 7, 2020, 6 pages.
Non-Final Office Action Received for U.S. Appl. No. 16/260,905, dated Jul. 17, 2019, 17 pages.
Non-Final Office Action received for U.S. Appl. No. 16/288,632, dated Nov. 21, 2019, 10 pages.
Notice of Allowance received for Canadian Patent Application No. 3,075,071, dated Aug. 6, 2020, 1 page.
Notice of Allowance received for U.S. Appl. No. 16/260,905, dated Jan. 17, 2020, 8 pages.
Notice of Allowance received for U.S. Appl. No. 16/288,632, dated Jul. 20, 2020, 5 pages.
Notice of Acceptance received for Australian Patent Application No. 2019213409, dated Sep. 9, 2020, 3 pages.
Brief Communication Regarding Oral Proceedings received for European Patent Application No. 17171177.3, mailed on Nov. 16, 2020, 2 pages.

\* cited by examiner

VIDEO MANAGER FOR PORTABLE MULTIFUNCTION DEVICE

RELATED APPLICATIONS

This application is a continuation of U.S. patent application Ser. No. 13/155,304, filed Jun. 7, 2011, now U.S. Pat. No. 8,547,355, which is divisional of U.S. patent application Ser. No. 11/850,008, filed Sep. 4, 2007, now U.S. Pat. No. 7,956,849, which claims priority to U.S. Provisional Patent Application Nos. 60/937,993, "Portable Multifunction Device," filed Jun. 29, 2007; 60/946,973, "Video Manager for Portable Multifunction Device," filed Jun. 28, 2007; 60/883,784, "Video Manager for Portable Multifunction Device" filed Jan. 6, 2007; 60/879,469, "Portable Multifunction Device," filed Jan. 8, 2007; 60/879,253, "Portable Multifunction Device," filed Jan. 7, 2007; and 60/824,769, "Portable Multifunction Device," filed Sep. 6, 2006. All of these applications are incorporated by referenced herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006. All of these applications are incorporated by reference herein.

TECHNICAL FIELD

The disclosed embodiments relate generally to portable electronic devices, and more particularly, to portable devices that are capable of playing digital video.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Many devices that are capable of playing and displaying digital video are the size of small laptops, and are, in fact, not handheld. This proves for more difficult portability. Other devices for playing digital video that are designed to be handheld may only be used in one orientation. The size of the screens of such devices is commonly quite small, and is therefore not conducive to watching digital videos. Moreover, having only one orientation restricts the user interface functionality because some functions (e.g., viewing a list of videos) may be more readily done in a portrait display orientation while other functions (watching a video) may be more readily done in a landscape display orientation, which more fully uses the display to show the video.

Accordingly, there is a need for portable multifunction devices with more transparent and intuitive user interfaces for video playback that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, in addition to digital video playing, the functions may include telephoning, video conferencing, e-mailing, instant messaging, blogging, digital photographing, digital videoing, web browsing, and/or digital music playing. Instructions for performing these functions may be included in a computer readable storage medium or other computer program product configured for execution by one or more processors.

In accordance with some embodiments of the present invention, a computer-implemented method performed at a portable electronic device with a touch screen display includes displaying, in a portrait orientation of the touch screen display, a list of video items. The method also includes automatically displaying, upon user selection of a respective video item in the list, the user selected video item in a landscape orientation of the touch screen display.

In accordance with some embodiments of the present invention, a computer-implemented method performed at a portable multifunction device with a touch screen display includes at least two modes of operation. The first mode of operation includes performing wireless telephony. The second mode of operation includes displaying, in a portrait orientation of the touch screen display, a list of video items, and automatically displaying, upon user selection of a respective video item in the list, the user selected video item in a landscape orientation of the touch screen display.

In accordance with some embodiments of the present invention, a computer-implemented method performed at a handheld electronic device with a touch screen display includes displaying a user selected video program on the touch screen display, and displaying an interactive progress bar upon detecting user contact with the touch screen display.

In accordance with some embodiments of the present invention, a portable electronic device for displaying information includes a touch screen display; memory, one or more processors, and one or more modules stored in memory. The one or more modules are configured for execution by the one or more processors and include instructions for: displaying, in a portrait orientation of the touch screen display, a list of video items; and, for execution upon user selection of a respective video item in the list, automatically displaying the user selected video item in a landscape orientation of the touch screen display.

In accordance with some embodiments of the present invention, a portable electronic device for displaying information includes a touch screen display; memory, one or more processors, and one or more modules stored in memory. The one or more modules are configured for execution by the one or more processors and include instructions for: in a first mode of operation, performing wireless telephony. The one or more modules also includes instructions for: in a second mode of operation, displaying, in a portrait orientation of the touch screen display, a list of video items; and, for execution upon user selection of a respective video item in the list, automatically displaying the user selected video item in a landscape orientation of the touch screen display.

In accordance with some embodiments of the present invention, a portable electronic device for displaying information includes a touch screen display; memory, one or more processors, and one or more modules stored in memory. The one or more modules are configured for execution by the one or more processors and include instructions for: displaying a user selected video program on the touch screen display; and, for execution upon detecting user contact with the touch screen display, displaying a progress bar.

In accordance with some embodiments of the present invention, a computer program product for use in conjunction with a portable electronic device with a touch screen display includes a computer readable storage medium and a computer program mechanism (e.g., one or more computer programs) embedded therein. The computer program mechanism includes instructions for displaying, in a portrait orientation of the touch screen display, a list of video items. The computer program mechanism also includes instructions, for execution upon user selection of a respective video item in the list, for automatically displaying the user selected video item in a landscape orientation of the touch screen display.

In accordance with some embodiments of the present invention, a computer program product for use in conjunction with a portable electronic device with a touch screen display includes a computer readable storage medium and a computer program mechanism (e.g., one or more computer programs) embedded therein. The computer program mechanism comprises instructions for: in a first mode of operation, performing wireless telephony; displaying, in a portrait orientation of the touch screen display, a list of video items; and, for execution upon user selection of a respective video item in the list, automatically displaying the user selected video item in a landscape orientation of the touch screen display.

In accordance with some embodiments of the present invention, a computer program product for use in conjunction with a portable electronic device with a touch screen display includes a computer readable storage medium and a computer program mechanism (e.g., one or more computer programs) embedded therein. The computer program mechanism comprises instructions for: displaying a user selected video program on the touch screen display; and, for execution upon detecting user contact with the touch screen display, displaying a progress bar.

In accordance with some embodiments of the present invention, a portable electronic device with a touch screen display includes means for displaying a list of video items in a portrait orientation of the touch screen display. The method also includes means, for execution upon user selection of a respective video item in the list, for automatically displaying the user selected video item in a landscape orientation of the touch screen display.

In accordance with some embodiments of the present invention, a portable multifunction device with a touch screen display includes: in a first mode of operation, means for performing wireless telephony. The method also includes: in a second mode of operation means for displaying, in a portrait orientation of the touch screen display, a list of video items; and means, for execution upon user selection of a respective video item in the list, for automatically displaying the user selected video item in a landscape orientation of the touch screen display.

In accordance with some embodiments of the present invention, a handheld electronic device with a touch screen display, includes means for displaying a user selected video program on the touch screen display. The method also includes means, for execution upon detecting user contact with the touch screen display, for displaying an interactive progress bar.

Thus, the invention provides an intuitive, easy-to-use interface for video playback on a portable electronic device with a touch screen display.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
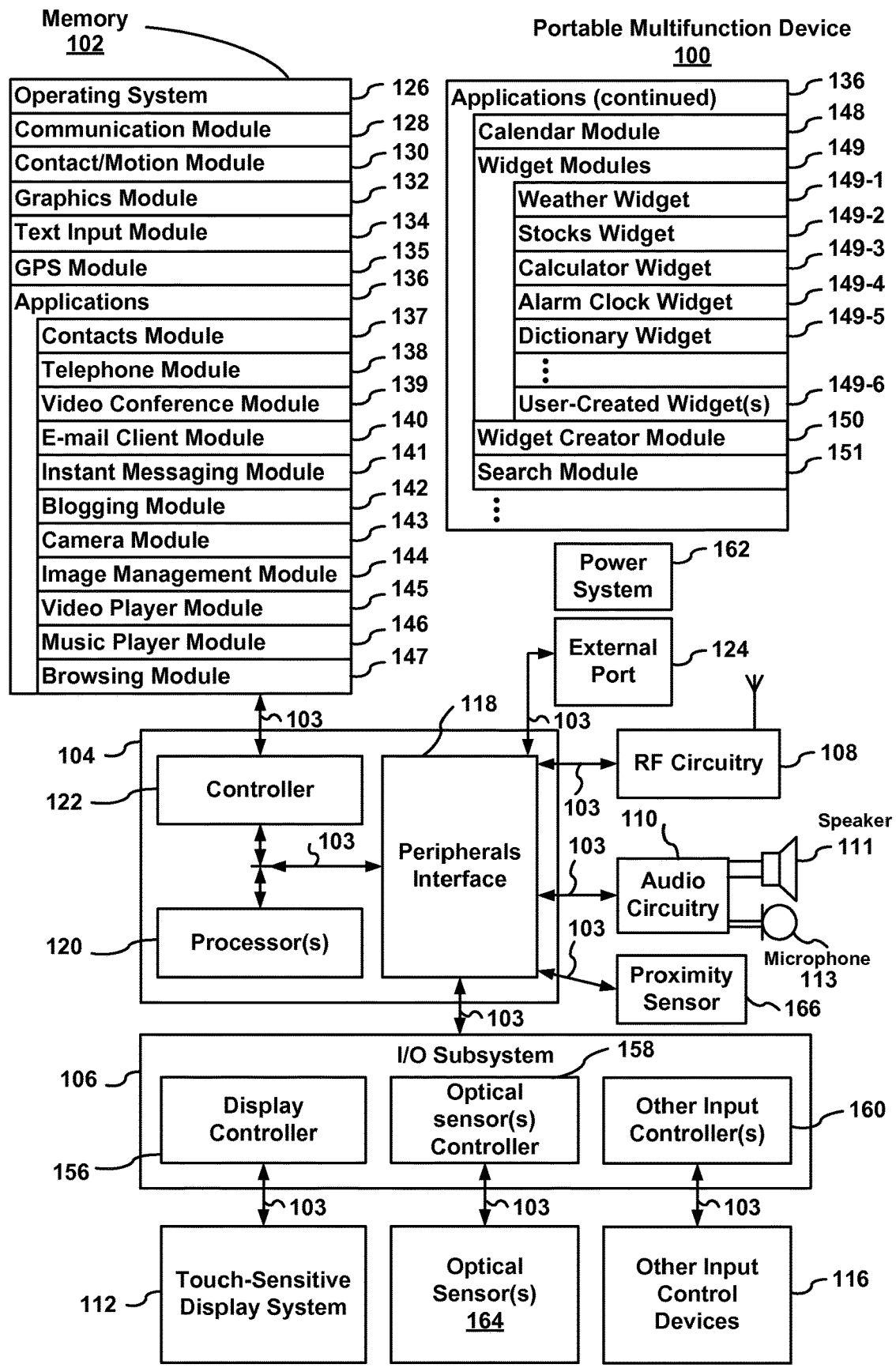
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

In some embodiments, in addition to the digital video player application, the device supports a variety of applications, such as one or more of the following: a telephone application, a video conferencing application, an e-mail application, an instant messaging application, a blogging application, a photo management application, a digital camera application, a digital video camera application, a web browsing application, and/or a digital music player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accept input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output. The touch screen 112 may have a resolution in excess of 100 dpi. In an exemplary embodiment, the touch screen has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed on touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143, the optical sensor 164 may capture still images or video. In some embodiments, an optical sensor is located on the back of the device 100, opposite the touch screen 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005, and Ser. No. 11/240,788 "Proximity Detector In Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

The contact/motion module 130 may detect contact with the touch screen 112 (in conjunction with the display controller 156) and other touch sensitive devices (e.g., a touchpad or click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6; and/or
- search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contacts list 137, and telephone module 138, the videoconferencing module 139 may be used to initiate, conduct, and terminate a video conference between a user and one or more other participants. Embodiments of user interfaces and associated processes using videoconferencing module 139 are described further below.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog). Embodiments of user interfaces and associated processes using blogging module 142 are described further below.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102. Embodiments of user interfaces and associated processes using camera module 143 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124). Embodiments of user interfaces and associated processes using video player module 145 are described further below.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Inc.). Embodiments of user interfaces and associated processes using music player module 146 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.). Embodiments of user interfaces and associated processes using calendar module 148 are described further below.

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget). Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms). Embodiments of user interfaces and associated processes using search module 151 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise rearranged in various embodiments. For example, video player module 145 may be combined with music player module 146 into a single module (e.g., an iPod module, not shown). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
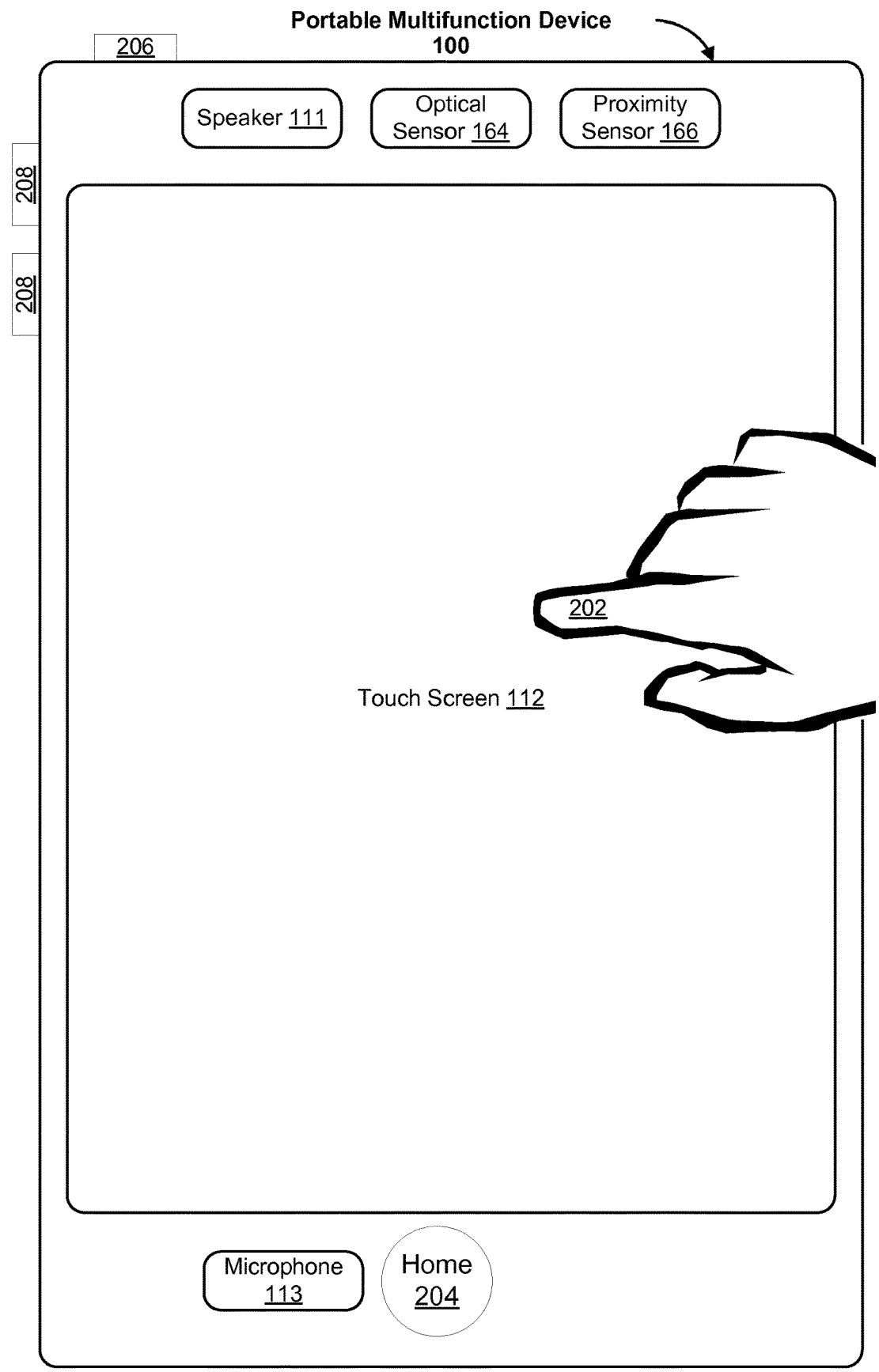
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward and/or a rolling of a finger (from right to left, left to right, upward and/or downward) that has made contact with the device 100. In some embodiments, inadvertent contact with a graphic may not select the graphic. For example, a swipe gesture with that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
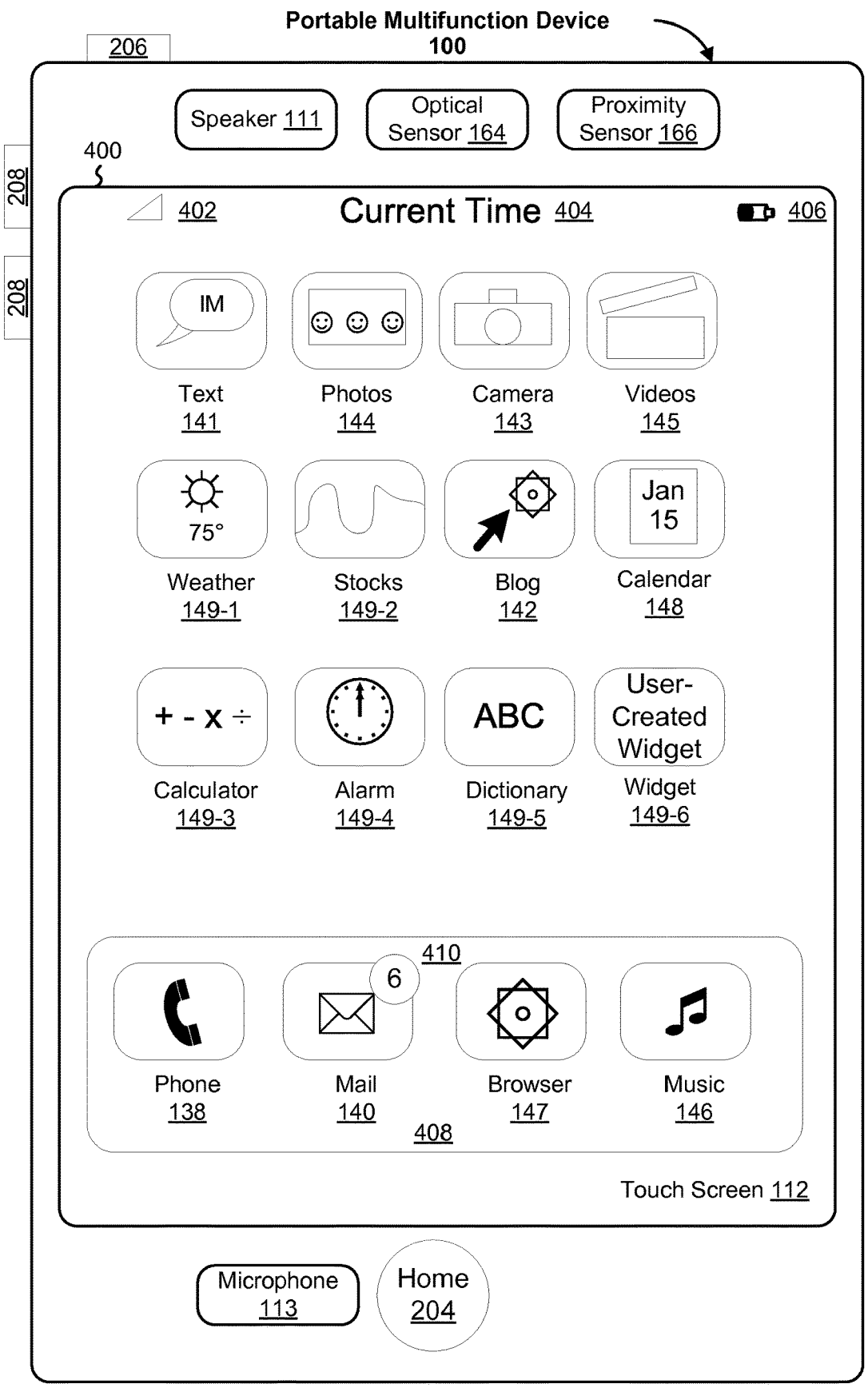
FIG. 3 illustrates an exemplary user interface for a menu of applications on a portable multifunction device in accordance with some embodiments.

FIG. 3 illustrates an exemplary user interface for a menu of applications on a portable multifunction device in accordance with some embodiments. In some embodiments, user interface 400 includes the following elements, or a subset or superset thereof:

Signal strength indicator 402 for wireless communication;
Time 404;
Battery status indicator 406;
Tray 408 with icons for frequently used applications, such as one or more of the following:
  Phone 138;
  E-mail client 140, which may include an indicator 410 of the number of unread e-mails;
  Browser 147; and
  Music player 146; and
Icons for other applications, such as one or more of the following:
  IM 141;
  Image management 144;
  Camera 143;
  Video player 145;
  Weather 149-1;
  Stocks 149-2;
  Blog 142;
  Calendar 148;
  Calculator 149-3;
  Alarm clock 149-4;
  Dictionary 149-5; and
  User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

Figure 4A:
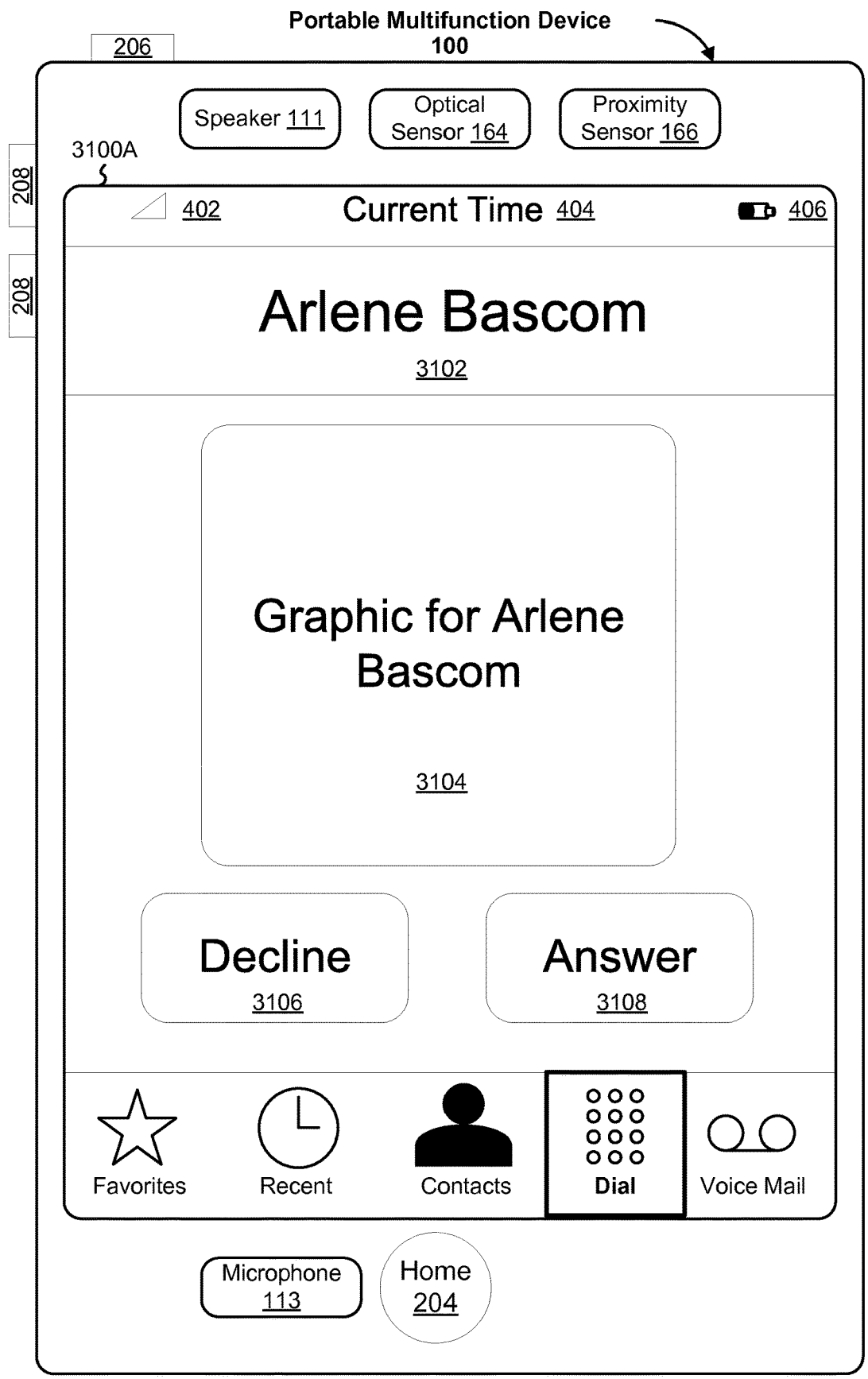
FIGS. 4A and 4B illustrate an exemplary user interface displayed during an incoming call in accordance with some embodiments.
Figure 4B:
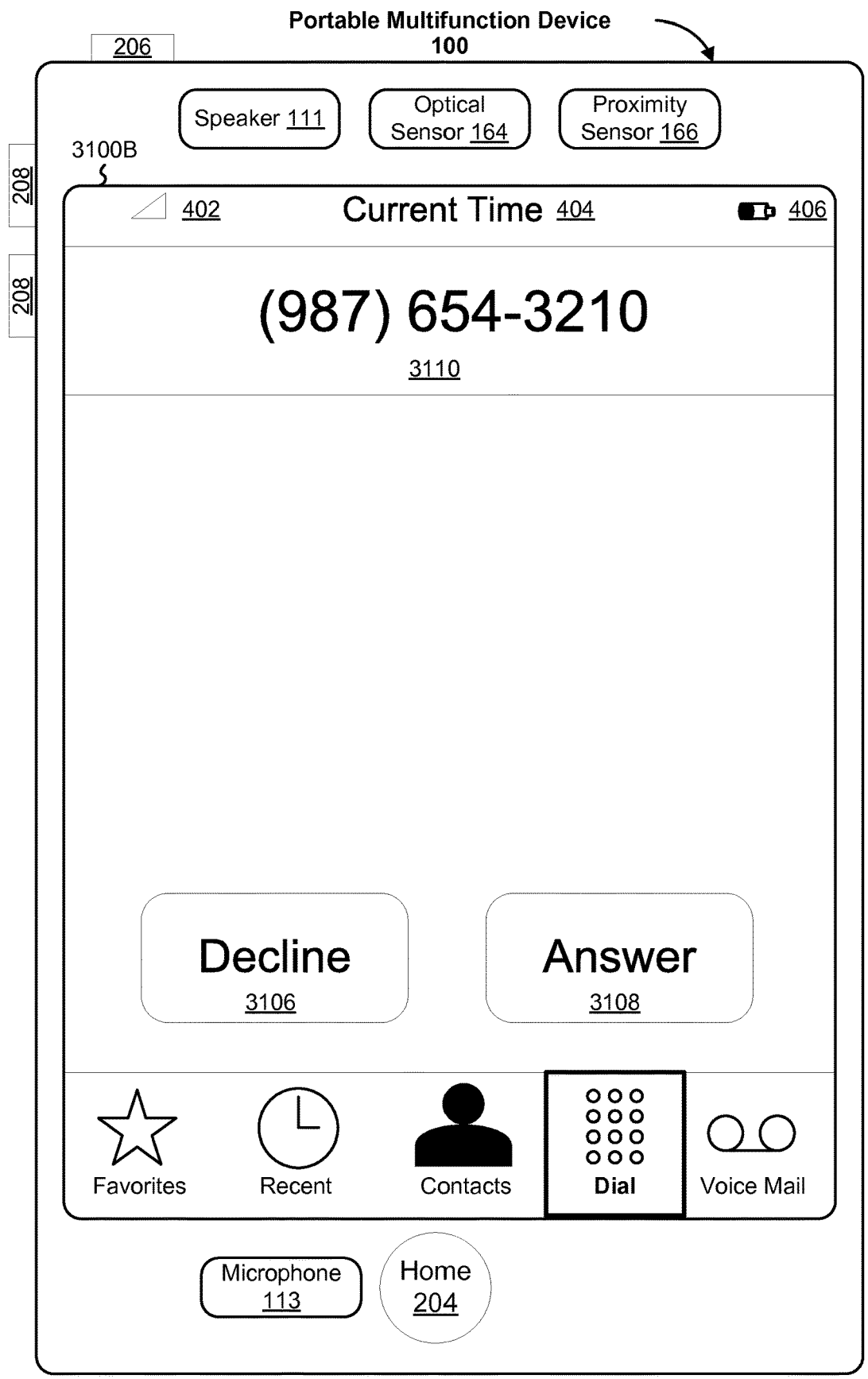

FIGS. 4A and 4B illustrate an exemplary user interface displayed during an incoming call in accordance with some embodiments.

In some embodiments, if the incoming call is from a phone number that is associated with a person or other entry in the user's contact list, then the touch screen may display: the name 3102 of the person or entry; a graphic 3104 associated with the person or entry; a Decline icon 3106 that when activated (e.g., by a finger tap on the icon) causes the phone module to decline the call and/or initiate voicemail for the call; and an answer icon 3108 that when activated (e.g., by a finger tap on the icon) causes the phone module to answer the call (e.g., UI 3100A, FIG. 4A).

In some embodiments, if the incoming call is from a phone number that is not associated with a person or other entry in the user's contact list, then the touch screen may display: the phone number of the other party 3110; a Decline icon 3106 that when activated (e.g., by a finger tap on the icon) causes the phone module to decline the call and/or initiate voicemail for the call; and an answer icon 3108 that when activated (e.g., by a finger tap on the icon) causes the phone module to answer the call (e.g., UI 3100B, FIG. 4B).

In some embodiments, the device pauses some other applications (e.g., the music player 146, video player, and/or slide show) when there is an incoming call; displays UI 3100A or UI 3100B prior to the call being answered; displays UI 3000B during the call; and terminates the pause on the other applications if the incoming call is declined or the call ends. In some embodiments, there is a smooth transition into and out of a pause (e.g., a smooth lowering and raising of the sound volume for the music or video player).

Figure 5A:
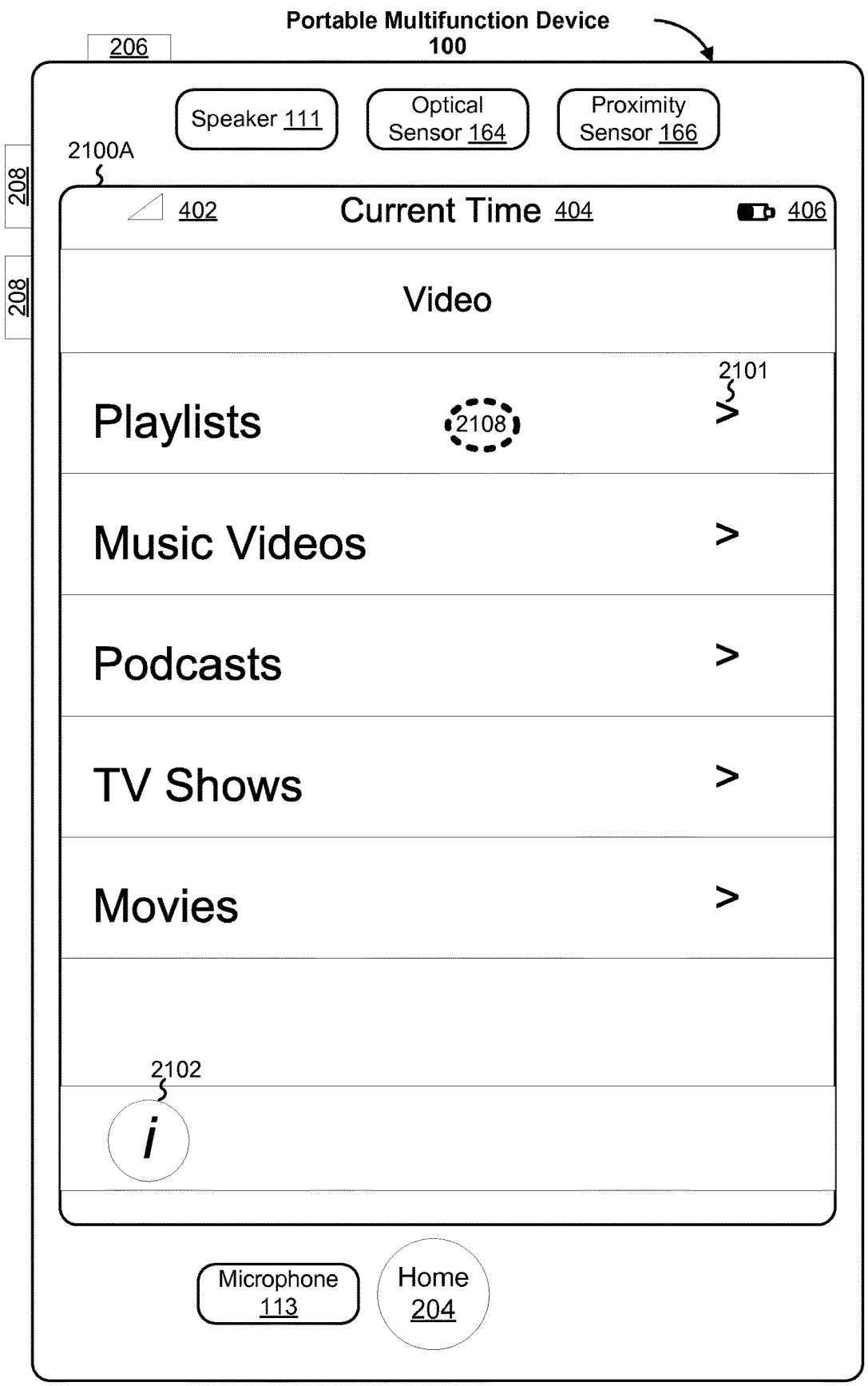
FIGS. 5A-5C illustrate an exemplary user interface for organizing and managing videos in accordance with some embodiments.
Figure 5B:
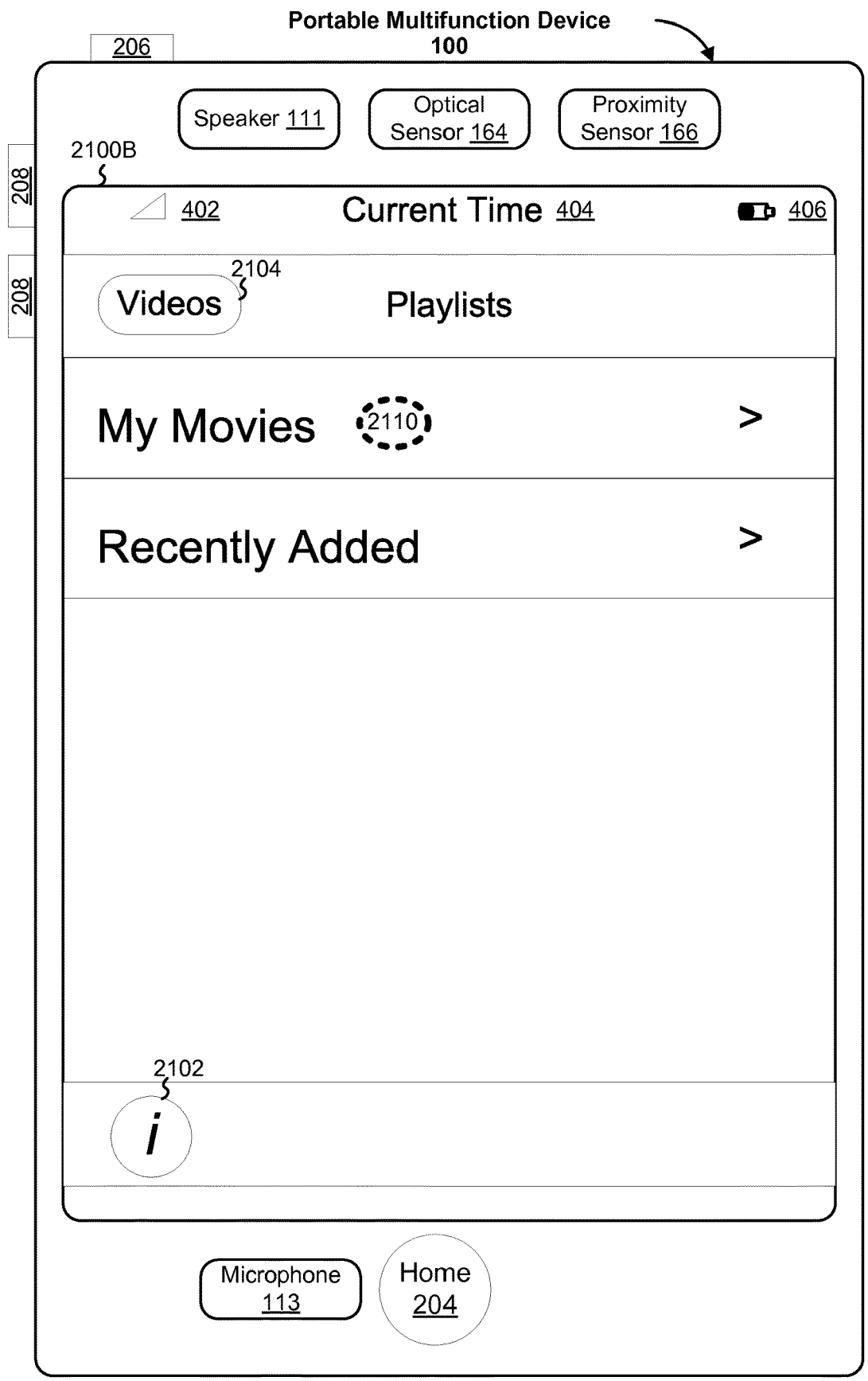
Figure 5C:
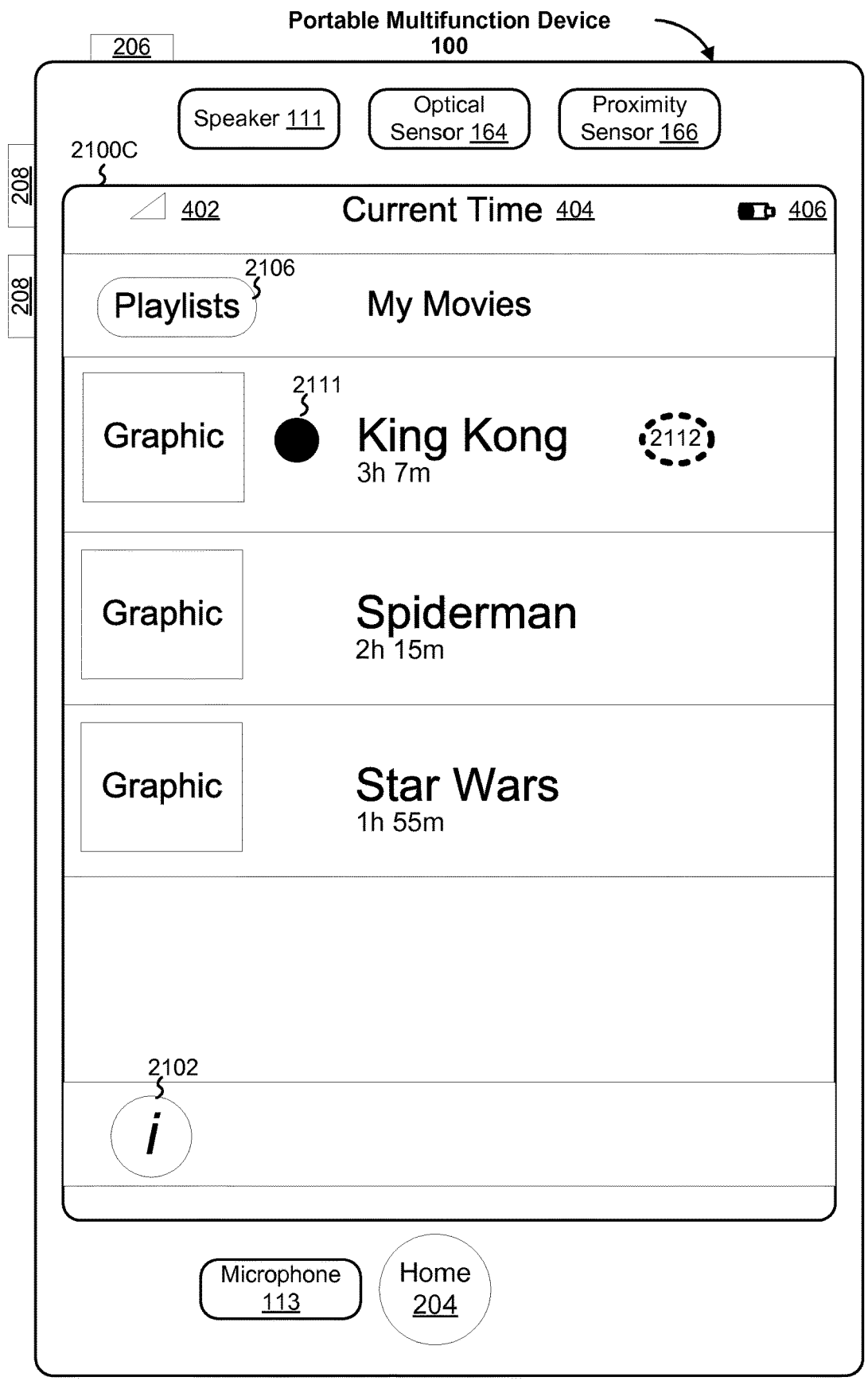

FIGS. 5A-5C illustrate an exemplary user interface for organizing and managing videos in accordance with some embodiments.

In some embodiments, in response to a series of gestures (e.g., finger taps) by the user, the device displays a series of video categories and sub-categories. For example, if the user activates selection icon 2101 (e.g., by a finger tap on the icon) or, in some embodiments, taps anywhere in the Playlist row 2108, the UI changes from a display of video categories (UI 2100A, FIG. 5A) to a display of Playlist sub-categories (UI 2100B, FIG. 5B). In turn, if the user activates the selection icon for My Movies (e.g., by a finger tap on the icon) or, in some embodiments, taps anywhere in the My Movies row 2110, the UI changes from a display of Playlist sub-categories (UI 2100B, FIG. 5B) to a display of movie titles (UI 2100C, FIG. 5C) or movie subcategories (e.g., if the number of movie titles exceeds a threshold value, and there is more than one movie subcategory, movie subcategories may be shown). In some embodiments, videos that have not been viewed by the user are marked (e.g., by dot 2111, FIG. 5C).

In some embodiments, in response to a series of gestures (e.g., finger taps) by the user, the device navigates back up through the hierarchy of video categories and sub-categories. For example, if the user activates Playlists icon 2106 (e.g., by a finger tap on the icon), the UI changes from a display of My Movies sub-categories (UI 2100C, FIG. 5C) to a display of Playlist sub-categories (UI 2100B, FIG. 5B). In turn, if the user activates the Videos icon 2104 (e.g., by a finger tap on the icon), the UI changes from a display of Playlist sub-categories (UI 2100B, FIG. 5B) to a display of video categories (UI 2100A, FIG. 5A).

In some embodiments, the videos are displayed in a flat list when there are just a few unrelated video items in the list. But related video items are grouped into subcategories in the list when the related video items exceed a predefined threshold. For example, three episodes of a television show (e.g., "The Office") are shown separately in the flat list, but four or more episodes are grouped into a single subcategory titled "The Office" that is displayed in the otherwise flat list of video items. Similarly, three podcasts with a common publisher or three music videos by a common artist are shown separately in the flat list, but four or more related podcasts or four or more related music videos are grouped into a single subcategory that is displayed in the otherwise flat list of video items. Additional examples of this adaptive list hierarchy are described in U.S. Provisional Patent Application Nos. 60/937,992, "Portable Multifunction Device, Method, and Graphical User Interface for Displaying User Interface Objects Adaptively," filed Jun. 29, 2007; 60/937,993, "Portable Multifunction Device," filed Jun. 29, 2007; 60/879,469, "Portable Multifunction Device," filed Jan. 8, 2007; and 60/879,253, "Portable Multifunction Device," filed Jan. 7, 2007, which are hereby incorporated by reference in their entirety.

In some embodiments, in response to user selection of a particular video (e.g., by a tap or other predefined gesture on the graphic, title, or anywhere 2112 in the row for a particular video), the device displays the selected video (e.g., King Kong) in a video player UI (e.g., UI 2300A).

A user may delete videos, as described in U.S. Provisional Patent Application Nos. 60/883,814, "Deletion Gestures On A Portable Multifunction Device," filed Jan. 7, 2007) and Ser. No. 60/936,755, "Deletion Gestures On A Portable Multifunction Device," filed Jun. 22, 2007, which are hereby incorporated by reference in their entirety.

In some embodiments, in response to user selection of settings icon 2102 (e.g., by a finger tap on the icon), the device displays a settings UI (UI 2200A, FIG. 6A) for a video player.

Figure 6A:
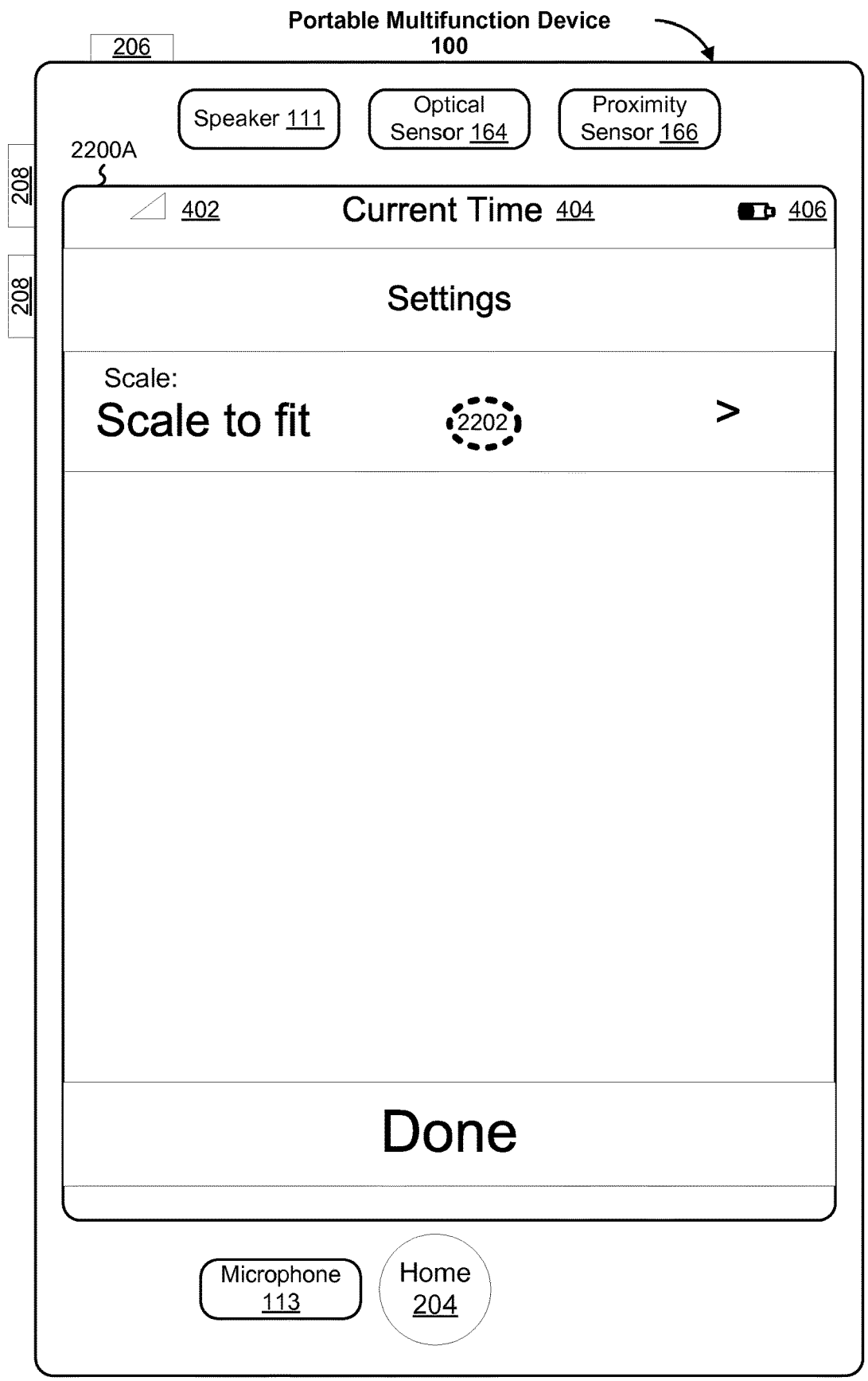
FIGS. 6A and 6B illustrate an exemplary user interface for setting user preferences for a video player in accordance with some embodiments.
Figure 6B:
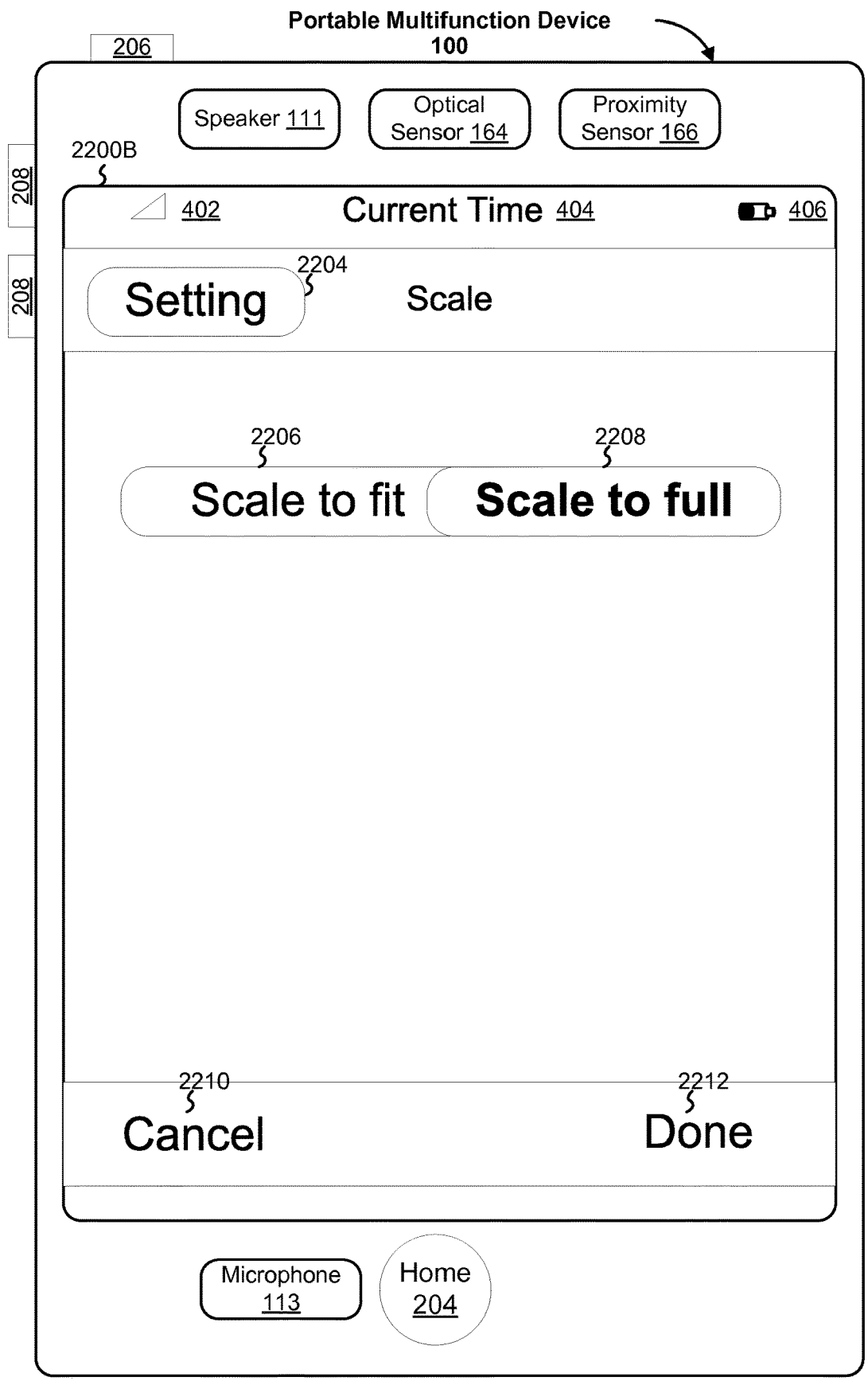

FIGS. 6A and 6B illustrate an exemplary user interface for setting user preferences for a video player in accordance with some embodiments. In some embodiments, a user may make a tap or other predefined gesture anywhere in a row for a particular setting to initiate display of the corresponding setting choices. For example, in response to a tap 2202 on the Scale to fit setting (UI 2200A, FIG. 6A), the device displays the setting choices for scale to fit (UI 2200B, FIG. 6B).

Figure 7A:
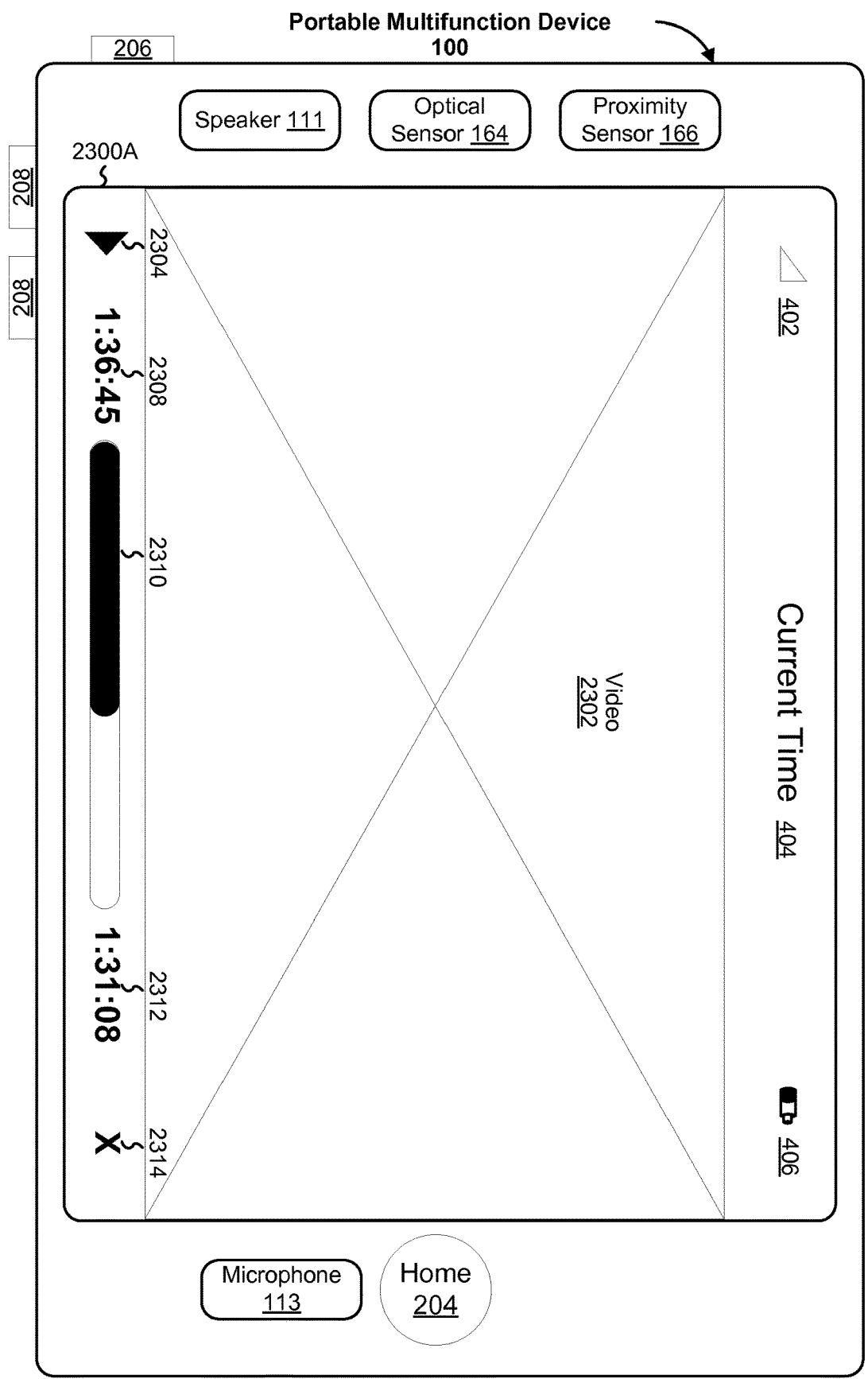
FIGS. 7A and 7B illustrate an exemplary user interface for a video player in accordance with some embodiments.
Figure 7B:
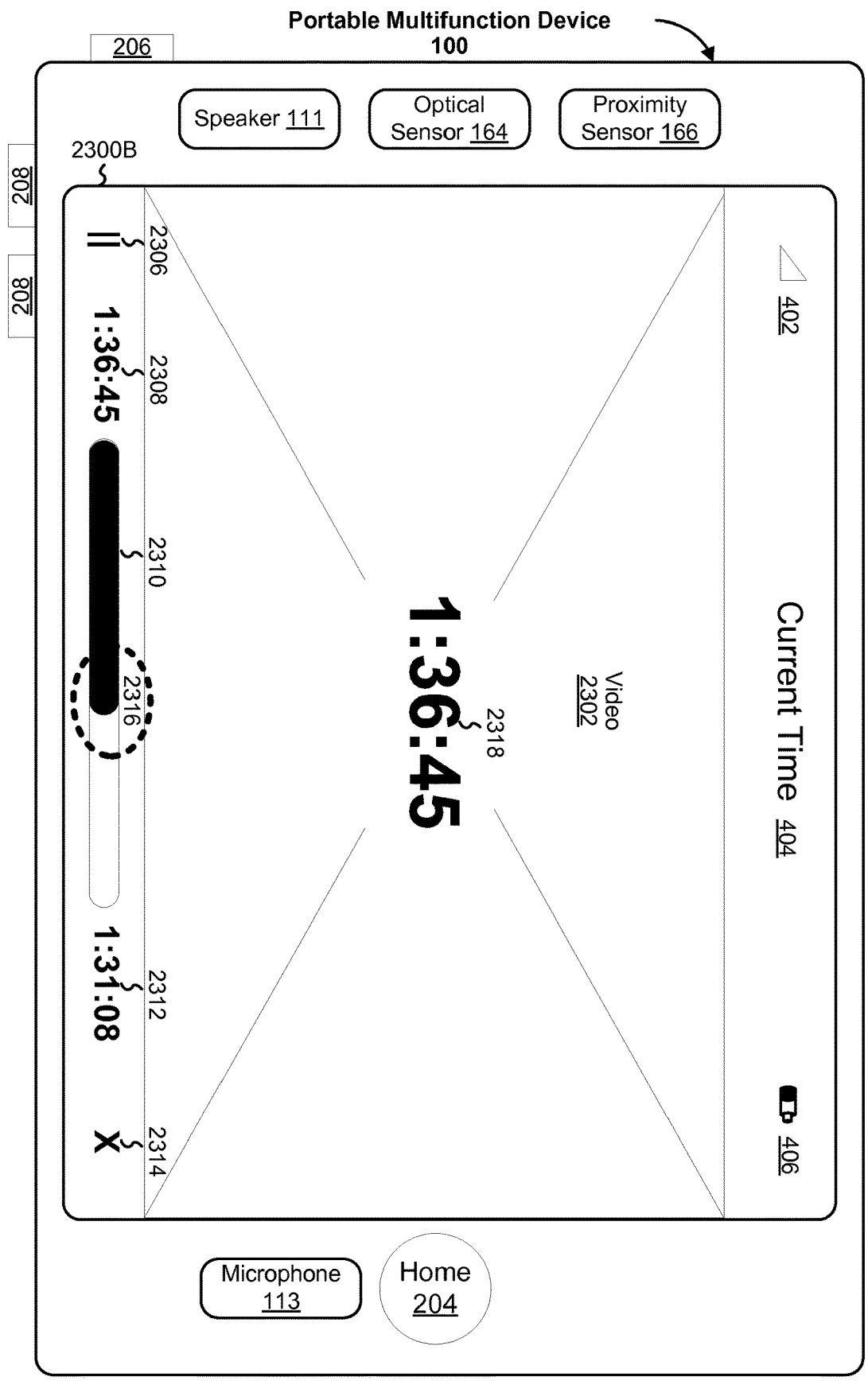

In some embodiments, user interface 2200B includes the following elements, or a subset or superset thereof:

- 402, 404, and 406, as described above;
- Settings icon 2204 that when activated (e.g., by a finger tap on the icon) returns the device to the settings UI (e.g., UI 2200A);
- Scale to fit icon 2206 that when activated (e.g., by a finger tap on the icon) sets the video player to scale the video to fit into the touch screen 112, which may result in two horizontal black or blank bands at the top and bottom of the display for wide-screen movies (or, more generally one or two bands of display space not used to display a movie or other video content);
- Scale to full icon 2208 that when activated (e.g., by a finger tap on the icon) sets the video player to fill the touch screen 112 with the video;
- Cancel icon 2210 that when activated (e.g., by a finger tap on the icon) returns the device to the previous UI (e.g., UI 2200A) without saving any changes selected by the user; and
- Done icon 2212 that when activated (e.g., by a finger tap on the icon) saves the setting selected by the user and returns the device to the previous UI (e.g., UI 2200A);

FIGS. 7A and 7B illustrate an exemplary user interface for a video player in accordance with some embodiments. In some embodiments, user interfaces 2300A and 2300B includes the following elements, or a subset or superset thereof:

- 402, 404, and 406, as described above;
- Video region 2302 for displaying video content;
- Play icon 2304 that when activated (e.g., by a finger tap on the icon) initiates playing the video in video region 2302, either from the beginning or from where the video was paused;
- Pause icon 2306 that when activated (e.g., by a finger tap on the icon) initiates pausing the video in video region 2302;
- Lapsed time 2308 that shows how much of the video has been played, in units of time;
- Progress bar 2310 that indicates what fraction of the video has been played and that may be used to scroll through the video (or to the jump forward or back to user selected position in the video) in response to a user gesture;
- Remaining time 2312 that shows how much of the video remains to be played, in units of time;
- Exit icon 2314 that when activated (e.g., by a finger tap on the icon) initiates exiting the video player UI (e.g., UI 2300A) and returning to another UI (e.g., UI 2100C, FIG. 5C); and
- Enlarged lapsed time 2318 that may appear in response to a predefined user gesture 2316 (or, alternately, any of a predefined set of user gestures) on or near the progress bar 2310.

In some embodiments, in response to user selection of a particular video (e.g., by a tap or other predefined gesture on the graphic, title, or anywhere 2112 in the row for a particular video in UI 2100C), the device displays the selected video (e.g., King Kong) in a video player UI (e.g., UI 2300A). In some embodiments, the device automatically displays the video in landscape mode on the touch screen, rather than in portrait mode, to increase the size of the image on the touch screen.

In some embodiments, graphics other than the video 2302 (e.g., graphics 2304, 2306 2308, 2310, 2312, and/or 2314) may fade out if there is no contact with the touch screen 112 for a predefined time. In some embodiments, these graphics may reappear if contact is made with the touch screen, thereby producing a "heads up display" effect for these graphics. In some embodiments, for wide screen movies displayed in fit-to-screen mode, graphics may be displayed in the black horizontal bands above and below the video 2302, to avoid obscuring the video.

In some embodiments, in response to a user gesture, the lapsed time in the video can be modified. For example, in response to the user's finger touching 2316 at or near the position in the progress bar 2310 corresponding to a current playback position, and then sliding along the progress bar 2310, the lapsed time may be altered to correspond to the position of the user's finger along the progress bar. In some embodiments, enlarged lapsed time 2318 is displayed during this user gesture to indicate where the video will resume playing when the gesture ends or is completed (FIG. 7B). In some embodiments, one or more still images from the video 2302 that correspond to where the video will resume playing are displayed as the user's finger is moved along the progress bar. This user gesture on the progress bar makes it easy for a user to select a particular scene in a video for viewing.

In the present document, the term "if" may be construed to mean "when," or "upon," or "in response to determining," or "in response to detecting," depending on the context. Similarly, the phrase "if it is determined" or "if [a stated condition or event] is detected" may be construed to mean "upon determining," or "in response to determining," or "upon detecting" the stated condition or event, or "in response to detecting" the stated condition or event, depending on the context.

Figure 8A:
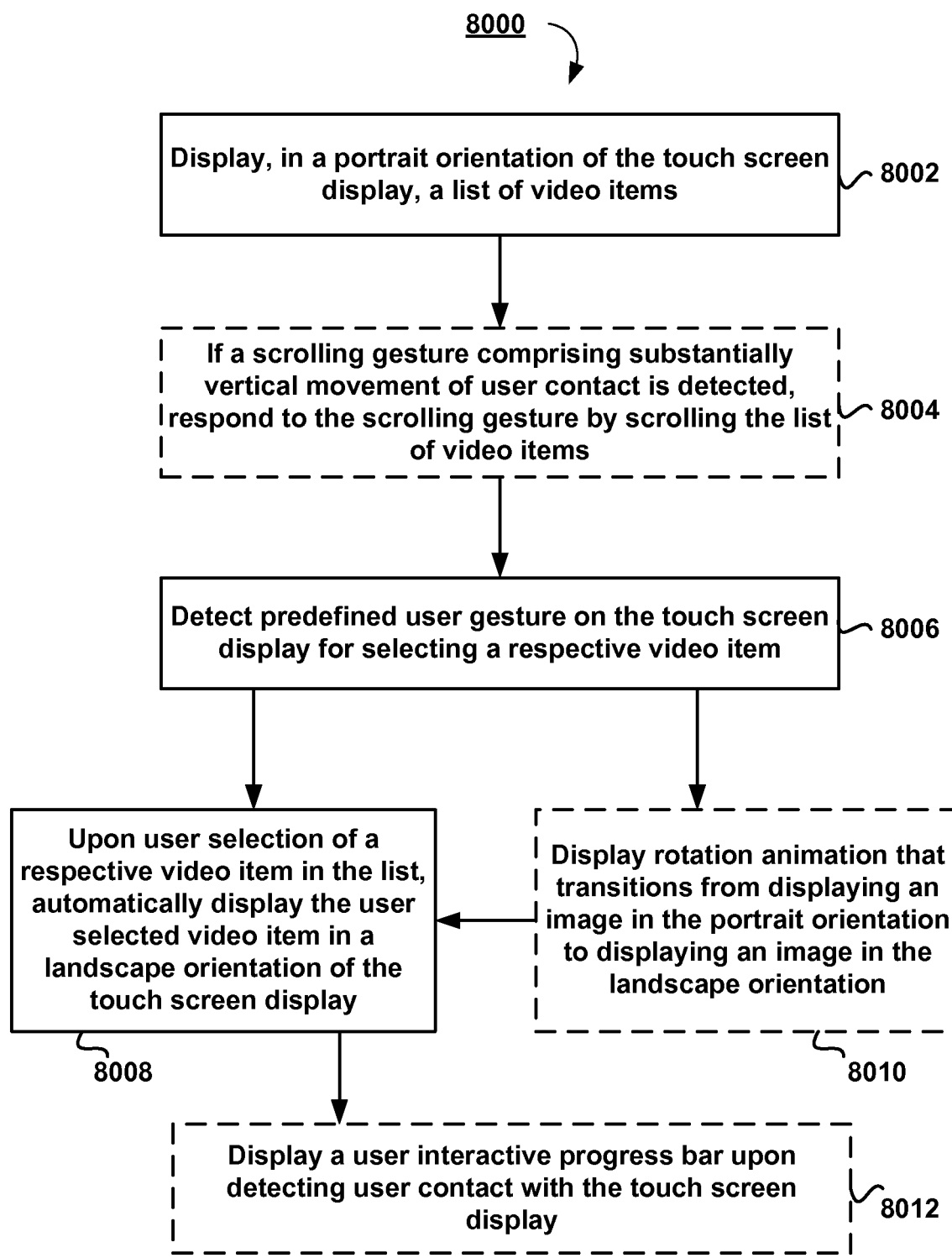
FIG. 8A is a flow diagram of a process for displaying video images in accordance with some embodiments.

FIG. 8A is a flow diagram of a process 8000 for displaying video images in accordance with some embodiments. In some embodiments, the process 8000 is performed by a portable electronic device with a touch screen display. The device displays a list of video items in a portrait orientation of the touch screen display (8002) (e.g., as shown in FIGS. 5A-5C, which are discussed in detail above). If a scrolling gesture comprising substantially vertical movement of user contact is detected (e.g., by contact/motion module 130), the device responds to the scrolling gesture by scrolling the list of video items (8004). The device may then detect a predefined user gesture on the touch screen for selecting a respective video item (8006). In some embodiments, the predefined user gesture is a finger tap (e.g., 2112 in FIG. 5C). In other embodiments, the predefined user gesture may be any other form of finger contact with the touch screen signifying selection of a video item.

When a user selects a respective video item in the list (with a finger tap or other predefined user gesture), the device automatically displays the user selected video item in a landscape orientation of the touch screen display (8008). In some embodiments, the automatic display of the video item occurs by the device displaying a rotation animation that transitions from displaying an image in the portrait orientation (e.g., FIG. 5C) to displaying an image in the landscape orientation (8010) (e.g., FIG. 7A). In other words, the display of the list of video items in a portrait orientation transitions to the display of the selected video item by displaying a rotation animation from the portrait orientation to the landscape orientation. In some embodiments, while the selected video item is being displayed, a user interactive progress bar is displayed upon detection of user contact with the touch screen display (8012).

Thus, the portable electronic device provides a portrait display orientation for displaying a list of videos, which permits a larger portion of the list to be viewed than if a landscape display orientation were used, and a landscape display orientation is provided for displaying a video, which more fully uses the display to show the video.

Figure 8B:
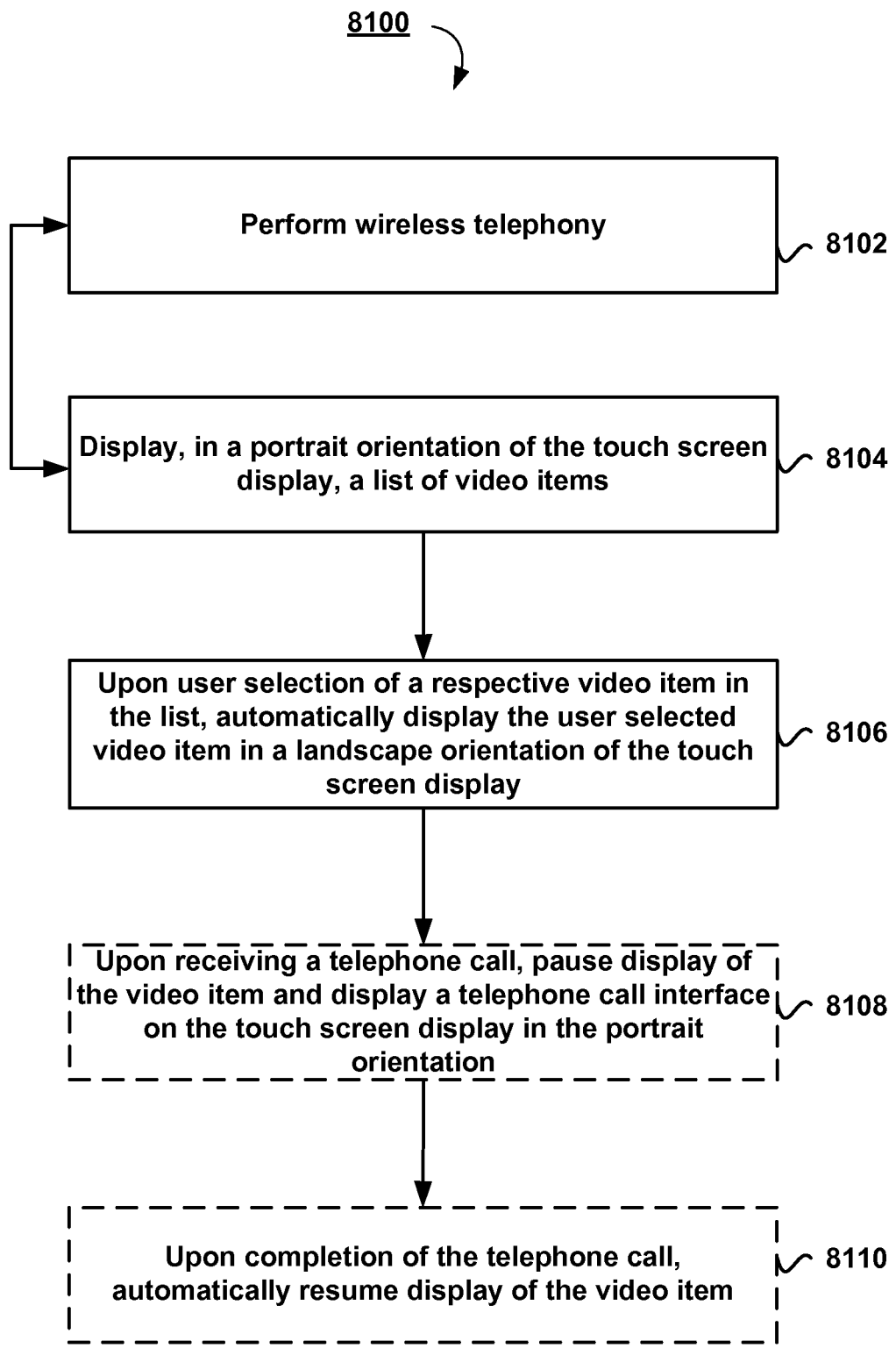
FIG. 8B is a flow diagram of a process for displaying video images in accordance with some embodiments.

FIG. 8B is a flow diagram of a process 8100 for displaying video images in accordance with some embodiments. In some embodiments, the process 8100 is performed by a portable multifunction device with a touch screen display. The process 8100 includes two modes of operations. The first mode of operation includes performing wireless telephony (8102) (e.g., with the telephone module 138). The second mode of operation includes displaying, in a portrait orientation of the touch screen display, a list of video items (8104). The second mode of operation also includes, upon user selection of a respective video item in the list of video items, automatically displaying the user selected video item in a landscape orientation of the touch screen display (8106). In some embodiments, the selection of a respective video item is performed by a user contact with the touch screen display. The user contact may be a predefined gesture, such as a finger tap (e.g., 2112 in FIG. 5C).

In some embodiments, when a telephone call is received on the device, display of the video item is paused and a telephone call interface is displayed on the touch screen display in the portrait orientation (8108). Upon completion of the telephone call, the video display returns (8110). The video may be paused (the display remains still) until play is resumed by the user (e.g., by touching or tapping the play icon 2304, FIG. 7A) or the video may automatically resume playing.

Thus, the portable multifunction device provides an intuitive, easy-to-use interface that integrates a video player with a wireless telephone.

Figure 8C:
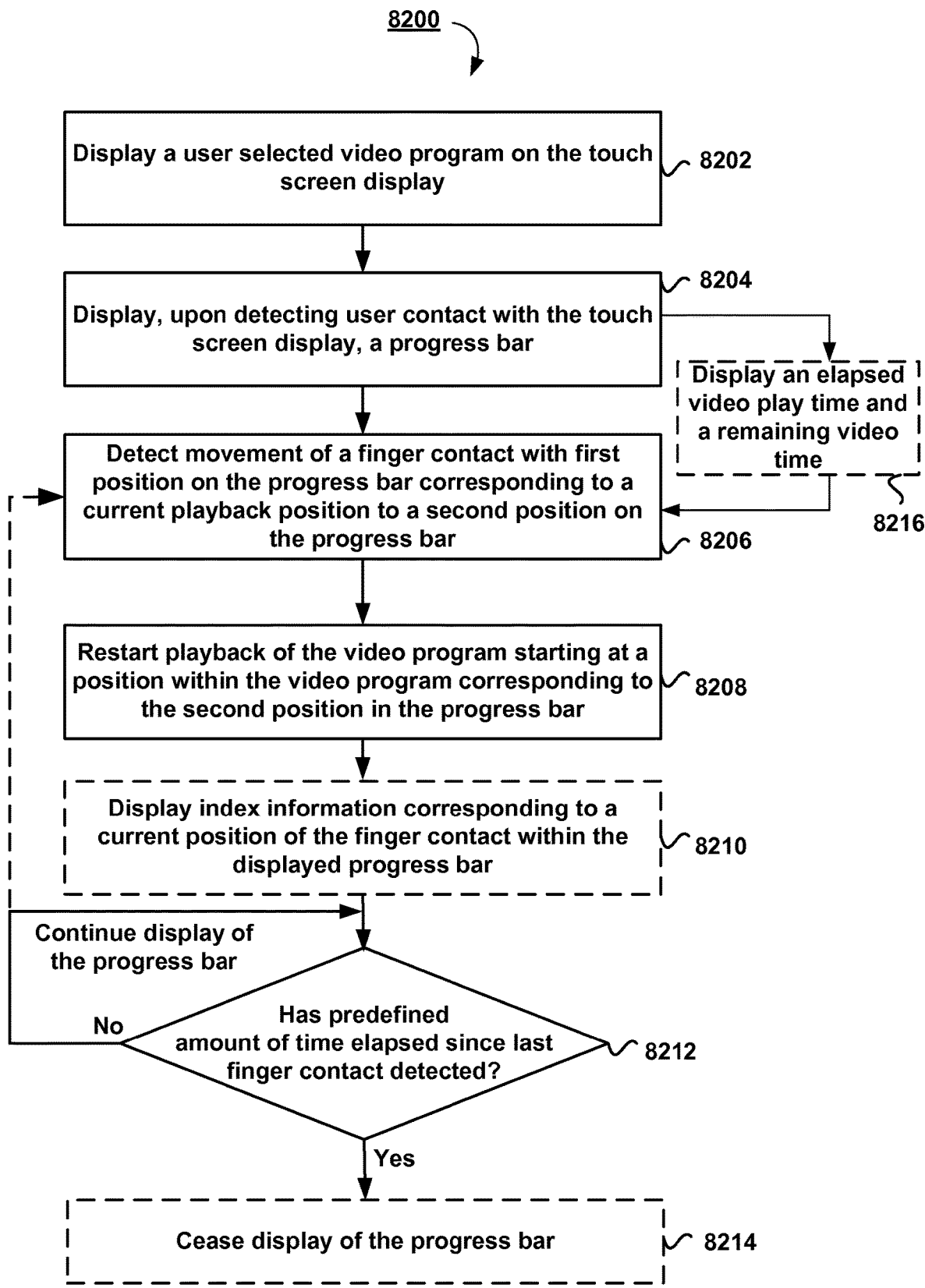
FIG. 8C is a flow diagram of a process for displaying video images in accordance with some embodiments.

FIG. 8C is a flow diagram of a process 8200 for displaying video images in accordance with some embodiments. In some embodiments, the process 8200 is performed by a handheld electronic device with a touch screen display. The device displays a user selected video program on the touch screen display (8202). Upon detection of user contact with the touch screen display, a progress bar is displayed (8204) (e.g., 2310 in FIG. 7A). If movement of a finger contact (e.g., 2316 in FIG. 7B) from a first position in the progress bar corresponding to a current playback position to a second position in the progress bar is detected (8206), then playback of the video program is restarted at a position within the video program corresponding to the second position in the progress bar (8208). In some embodiments, index information (e.g., 2308 and/or 2318 in FIG. 7B) corresponding to a current position of the finger contact within the displayed progress bar is displayed (8210).

A determination is made about whether a predefined amount of time (e.g., a value between 0.5 and 2.0 seconds, although larger or smaller values could also be used) has elapsed since the last finger contact with the touch screen was detected (8212). If the predefined amount of time has elapsed (8212—Yes), display of the progress bar ceases (8214). In other words, the progress bar fades out or otherwise disappears from the touch screen display. In some embodiments, if the progress bar disappears, the display size of the video program increases, but a predefined aspect ratio for displaying the video program is maintained. If the predefined amount of time has not elapsed (8212—No), the progress bar continues to be displayed on the touch screen display.

In some embodiments, while the progress bar is being displayed, an elapsed video play time is also displayed (e.g., 2308 in FIG. 7A). In other embodiments, while the progress bar is being displayed, a remaining video time is also displayed (e.g., 2312 in FIG. 7A). In yet other embodiments, both an elapsed video play time and a remaining video play time are also displayed (8216).

In some embodiments, a user may temporarily pause a movie currently being played by selecting the pause icon 2306 (as shown in FIG. 7B). The device keeps track of the last played location (also called the current playback location) in the movie. If the movie is paused for more than a predetermined time, the movie may be rewound in accordance to how long the movie has been paused. A predefined set or table of pause times and rewind amounts may be used to control this process. For example, if the movie is paused by more than X minutes (e.g., 5 minutes), the movie may be rewound by a first amount of time (e.g., one minute), and if the movie has been paused by more than Y minutes (e.g., 30 minutes), the movie may be rewound by a second amount of time (e.g., 2 minutes). When the movie is re-started, for example, by selecting the play icon 2304 (FIG. 7A), the movie continues to play at the determined rewound location in the movie. In some embodiments, if the movie has been paused for more than a predetermined time (e.g., 48 hours, or any other appropriate value), the movie may be re-played from the beginning when it is re-started. In some embodiments, the automatic rewind feature described above, may be implemented on currently playing podcasts, or audio books as well.

Thus, the handheld portable device provides an intuitive, easy-to-use interface that uses a finger contact to find a desired portion of a video.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a handheld electronic device with a touch screen display:
      displaying, in a video player user interface, a user selected video program on the touch screen display; and
      in response to detecting user contact with the touch screen display during display of the user selected video program:
         displaying in the video player user interface an interactive progress bar without changing the size of the displayed video program,
         displaying, in the video player user interface and concurrently with the display of the progress bar, an elapsed video play time adjacent to the progress bar, and
         displaying, in the video player user interface and concurrently with the display of the progress bar, an exit icon that when activated initiates a process to cease display of the video player user interface.

2. The method of claim 1, including
   detecting movement of a finger contact from a first position on the progress bar corresponding to a current playback position to a second position on the progress bar; and
   in response to detecting a break or pause of the finger contact, restarting playback of the video program starting at a position within the video program corresponding to the second position on the progress bar.

3. The method of claim 1, including
   in response to detecting finger contact with the displayed progress bar, displaying index information corresponding to a current position of the finger contact on the displayed progress bar.

4. The method of claim 3, including
   in response to detecting cessation of the finger contact with the touch screen display for at least a predefined amount of time, ceasing display of the progress bar.

5. The method of claim 1, including
   in response to detecting the user contact with the touch screen display, maintaining the display of the video program and displaying the user interactive progress bar in a region of the touch screen display not occupied by the video program.

6. The method of claim 1, including
   in response to detecting cessation of the user contact with the touch screen display for at least a predefined amount of time, ceasing display of the progress bar and the exit icon while maintaining the display of the video program.

7. The method of claim 1, further comprising:
   while displaying, in the video player user interface, the user selected video program, detecting a second user contact at a first position on the progress bar corresponding to a current playback position;
   in response to detecting the second user contact at the first position on the progress bar, displaying a first still image corresponding to the first position;
   detecting movement of the second user contact from the first position on the progress bar to a second position on the progress bar; and
   in response to detecting movement of the second user contact from the first position to the second position, displaying a second still image corresponding to the second position on the progress bar, wherein the second still image is different from the first still image.

8. A handheld electronic device, comprising:
   a touch screen display;
   memory;
   one or more processors; and
   one or more programs stored in the memory and executed by the one or more processors, the one or more programs including instructions for:
      displaying, in a video player user interface, a user selected video program on the touch screen display; and
      in response to detecting user contact with the touch screen display during display of the user selected video program:
         displaying in the video player user interface an interactive progress bar without changing the size of the displayed video program,
         displaying, in the video player user interface and concurrently with the display of the progress bar, an elapsed video play time adjacent to the progress bar, and
         displaying, in the video player user interface and concurrently with the display of the progress bar, an exit icon that when activated initiates a process to cease display of the video player user interface.

9. The device of claim 8, including instructions for:
   detecting movement of a finger contact from a first position on the progress bar corresponding to a current playback position to a second position on the progress bar; and in response to detecting a break or pause of the finger contact, restarting playback of the video program starting at a position within the video program corresponding to the second position on the progress bar.

10. The device of claim 8, including instructions for:
in response to detecting finger contact with the displayed progress bar, displaying index information corresponding to a current position of the finger contact on the displayed progress bar.

11. The device of claim 10, including instructions for:
in response to detecting cessation of the finger contact with the touch screen display for at least a predefined amount of time, ceasing display of the progress bar.

12. The device of claim 8, including instructions for:
in response to detecting the user contact with the touch screen display, maintaining the display of the video program and displaying the user interactive progress bar in a region of the touch screen display not occupied by the video program.

13. The device of claim 8, including instructions for:
in response to detecting cessation of the user contact with the touch screen display for at least a predefined amount of time, ceasing display of the progress bar and the exit icon while maintaining the display of the video program.

14. The device of claim 8, the one or more programs further including instructions for:
while displaying, in the video player user interface, the user selected video program, detecting a second user contact at a first position on the progress bar corresponding to a current playback position;
in response to detecting the second user contact at the first position on the progress bar, displaying a first still image corresponding to the first position;
detecting movement of the second user contact from the first position on the progress bar to a second position on the progress bar; and
in response to detecting movement of the second user contact from the first position to the second position, displaying a second still image corresponding to the second position on the progress bar, wherein the second still image is different from the first still image.

15. A non-transitory computer readable storage medium storing one or more programs, the one or more programs comprising instructions, which when executed by a handheld electronic device with a touch screen display, cause the device to:
display, in a video player user interface, a user selected video program on the touch screen display; and
in response to detecting user contact with the touch screen display during display of the user selected video program:
displaying in the video player user interface a progress bar without changing the size of the displayed video program,
displaying, in the video player user interface and concurrently with the display of the progress bar, an elapsed video play time adjacent to the progress bar, and
displaying, in the video player user interface and concurrently with the display of the progress bar, an exit icon that when activated initiates a process to cease display of the video player user interface.

16. The non-transitory computer readable storage medium of claim 15, including instructions which cause the device to:
detect movement of a finger contact from a first position on the progress bar corresponding to a current playback position to a second position on the progress bar; and
in response to detecting a break or pause of the finger contact, restart playback of the video program starting at a position within the video program corresponding to the second position on the progress bar.

17. The non-transitory computer readable storage medium of claim 15, including instructions which cause the device to:
in response to detecting finger contact with the displayed progress bar, display index information corresponding to a current position of the finger contact on the displayed progress bar.

18. The non-transitory computer readable storage medium of claim 17, including instructions which cause the device to:
in response to detecting cessation of the finger contact with the touch screen display for at least a predefined amount of time, cease display of the progress bar.

19. The non-transitory computer readable storage medium of claim 15, including instructions which cause the device to:
in response to detecting the user contact with the touch screen display, maintain the display of the video program and display the user interactive progress bar in a region of the touch screen display not occupied by the video program.

20. The non-transitory computer readable storage medium of claim 15, including instructions which cause the device to:
in response to detecting cessation of the user contact with the touch screen display for at least a predefined amount of time, cease display of the progress bar and the exit icon while maintaining the display of the video program.

21. The non-transitory computer readable storage medium of claim 15, the one or more programs further including instructions which cause the device to:
while displaying, in the video player user interface, the user selected video program, detect a second user contact at a first position on the progress bar corresponding to a current playback position;
in response to detecting the second user contact at the first position on the progress bar, display a first still image corresponding to the first position;
detect movement of the second user contact from the first position on the progress bar to a second position on the progress bar; and
in response to detecting movement of the second user contact from the first position to the second position, display a second still image corresponding to the second position on the progress bar, wherein the second still image is different from the first still image.

* * * * *